US012794653B2

(12) United States Patent
Maki et al.

(10) Patent No.: US 12,794,653 B2
(45) Date of Patent: Nov. 10, 2026

(54) BASE STATION, TERMINAL, AND COMMUNICATION METHOD

(71) Applicant: Panasonic Intellectual Property Corporation of America, Torrance, CA (US)

(72) Inventors: Shotaro Maki, Kanagawa (JP); Hidetoshi Suzuki, Kanagawa (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 332 days.

(21) Appl. No.: 18/551,754

(22) PCT Filed: Dec. 7, 2021

(86) PCT No.: PCT/JP2021/044844

§ 371 (c)(1),
(2) Date: Sep. 21, 2023

(87) PCT Pub. No.: WO2022/201651

PCT Pub. Date: Sep. 29, 2022

(65) Prior Publication Data

US 2024/0178979 A1 May 30, 2024

(30) Foreign Application Priority Data

Mar. 26, 2021 (JP) ................................ 2021-053453

(51) Int. Cl.
*H04L 5/00* (2006.01)
*H04W 72/23* (2023.01)

(52) U.S. Cl.
CPC .......... *H04L 5/0094* (2013.01); *H04L 5/0053* (2013.01); *H04W 72/23* (2023.01)

(58) Field of Classification Search
CPC .... H04L 5/0094; H04L 5/0053; H04W 72/23; H04W 72/04
See application file for complete search history.

(56) References Cited

U.S. PATENT DOCUMENTS 12,295,047 B2 * 5/2025 Tan .................. H04W 36/0033
12,395,996 B2 * 8/2025 Yi ............................ H04L 1/08
(Continued)

FOREIGN PATENT DOCUMENTS

JP 2013085281 A 5/2013
JP 2019516256 A 6/2019

OTHER PUBLICATIONS

3GPP; "3rd Generation Partnership Project; Technical Specification Group Radio Access Network; NR; NR and NG-RAN Overall Description; Stage 2 (Release 15)," 3GPP TS 38.300 V15.6.0, Jun. 2019. (99 pages).
(Continued)

*Primary Examiner* — John D Blanton
(74) *Attorney, Agent, or Firm* — Seed Intellectual Property Law Group LLP

(57) ABSTRACT

This base station comprises: a control circuit that generates a control signal related to the setting of a first bandwidth part, such generation being on the basis of a parameter for which there are less candidates than a parameter related to a second bandwidth part: and a transmission circuit that transmits the control signal.

6 Claims, 12 Drawing Sheets

(56) References Cited

U.S. PATENT DOCUMENTS

| | | | | |
|---|---|---|---|---|
| 2013/0294251 | A1* | 11/2013 | Hoshino | H04L 1/0001 370/236 |
| 2018/0262900 | A1* | 9/2018 | Moon | H04L 27/26 |
| 2019/0028315 | A1* | 1/2019 | Park | H04L 27/2657 |
| 2019/0103931 | A1* | 4/2019 | Yi | H04B 7/2656 |
| 2019/0313412 | A1* | 10/2019 | Baldemair | H04L 5/00 |
| 2020/0068512 | A1* | 2/2020 | Xue | H04L 5/0082 |
| 2020/0280426 | A1* | 9/2020 | Zhu | H04W 56/001 |
| 2020/0280962 | A1* | 9/2020 | Li | H04L 5/0055 |
| 2020/0344761 | A1* | 10/2020 | Amuru | H04L 27/2607 |
| 2021/0127367 | A1* | 4/2021 | Yi | H04W 72/23 |
| 2021/0168809 | A1* | 6/2021 | Sun | H04L 5/0053 |
| 2021/0329634 | A1* | 10/2021 | Kim | H04W 72/0453 |
| 2021/0329671 | A1* | 10/2021 | Kim | H04L 5/0042 |
| 2021/0345198 | A1* | 11/2021 | Zhang | H04L 5/001 |
| 2022/0046587 | A1* | 2/2022 | Rico Alvarino | H04L 1/1896 |
| 2022/0046722 | A1* | 2/2022 | Kim | H04L 5/001 |
| 2022/0279373 | A1* | 9/2022 | Hwang | H04L 5/001 |
| 2022/0377791 | A1* | 11/2022 | Nogami | H04W 56/0015 |
| 2023/0079810 | A1* | 3/2023 | Zheng | H04W 36/037 370/329 |
| 2023/0140310 | A1* | 5/2023 | Koskinen | H04L 5/001 370/329 |
| 2023/0180273 | A1* | 6/2023 | Lu | H04L 1/1854 |
| 2023/0223985 | A1* | 7/2023 | Rastegardoost | H04B 1/713 375/132 |
| 2023/0232313 | A1* | 7/2023 | Ji | H04B 7/024 370/329 |
| 2023/0262672 | A1* | 8/2023 | Lin | H04L 5/0007 370/329 |
| 2023/0276419 | A1* | 8/2023 | Takahashi | H04W 48/12 |
| 2023/0276441 | A1* | 8/2023 | Wang | H04W 72/23 370/329 |
| 2023/0284267 | A1* | 9/2023 | Fehrenbach | H04W 74/0808 370/329 |
| 2024/0015639 | A1* | 1/2024 | Kim | H04W 48/16 |
| 2024/0049292 | A1* | 2/2024 | Liu | H04L 1/0003 |
| 2024/0080821 | A1* | 3/2024 | Jan | H04W 48/12 |
| 2024/0080902 | A1* | 3/2024 | Dai | H04L 5/0053 |
| 2024/0178979 | A1* | 5/2024 | Maki | H04L 5/0053 |
| 2024/0187151 | A1* | 6/2024 | Qiao | H04L 5/0012 |
| 2024/0188061 | A1* | 6/2024 | Maki | H04W 72/0453 |
| 2025/0294522 | A1* | 9/2025 | Al | H04W 76/28 |

OTHER PUBLICATIONS

3GPP, "3rd Generation Partnership Project; Technical Specification Group Radio Access Network; NR; Physical channels and modulation (Release 15)," 3GPP TS 38.211 V15.6.0, Jun. 2019. 97 (pagaes).

3GPP, "3rd Generation Partnership Project; Technical Specification Group Radio Access Network; Study on Scenarios and Requirements for Next Generation Access Technologies; (Release 16)," 3GPP TR 38.913 v16.0.0, Jul. 2020. (40 pages).

3GPP; "3rd Generation Partnership Project; Technical Specification Group Services and System Aspects; System Architecture for the 5G System; Stage 2 (Release 16)," 3GPP TS 23.501 v16.1.0, Jun. 2019. (368 pages).

Ericsson, "New; SID on supleort of reduced capability NR devices," RP-193238, Agenda Item: 9.1.1, 3GPP TSG RAN Meeting #86, Sitges, Spain, Dec. 9-12, 2019. (5 pages).

International Search Report, mailed Mar. 15, 2022, for PCT Patent Application No. PCT/JP2021/044844. 6 (pages) (with English translation).

ITU, "IMT Vision—Framework and overall objectives of the future development of IMT for 2020 and beyond," Recommendation ITU-R M.2083-0, Sep. 2015. (21 pages).

NTT Docomo, Inc., "Revised WID on New Radio Access Technology," RP-181726, Agenda Item: 9.2.1, 3GPP TSG RAN Meeting #81, Gold Coast, Australia, Sep. 10-13, 2018. (12 pages).

Samsung, "Reduced PDCCH monitoring," R1-2008171, Agenda Item: 8.6.2, 3GPP TSG RAN WG1 #103, e-Meeting, Oct. 26-Nov. 13, 2020. (14 pages).

Samsung, "UE complexity reduction," R1-2008875, Agenda Item: 8.6.1, 3GPP TSG RAN WG1 #103-e, e-Meeting, Oct. 26-Nov. 13, 2020. (11 pages).

Spreadtrum Communications, "Discussion on reduced PDCCH monitoring, " R1-2006286, Agenda Item: 8.6.2, 3GPP TSG RAN WG1 #102, E-Meeting, Aug. 17-28, 2020. (4 pages).

* cited by examiner

| index | CRB index |
|---|---|
| 0 | 0 |
| 1 | 100 |
| 2 | 200 |
| 3 | 300 |

FIG. 6

| index | BW [RB] |
|---|---|
| 0 | 100 |
| 1 | 50 |

FIG. 7

| index | SCS [kHz] | |
|---|---|---|
| | FR1 | FR2 |
| 0 | 15 | 60 |
| 1 | 30 | 120 |

FIG. 8

| index | CORESET ID |
|---|---|
| 0 | 0-2 |
| 1 | 3-5 |

FIG. 9

| index | TCI state ID |
|---|---|
| 0 | 0, 1 |
| 1 | 2, 3 |

FIG. 10

BASE STATION, TERMINAL, AND COMMUNICATION METHOD

TECHNICAL FIELD

The present disclosure relates to a base station, a terminal, and a communication method.

BACKGROUND ART

A communication system called the 5th generation mobile communication system (5G) has been studied. The 3rd Generation Partnership Project (3GPP), which is an international standards-developing organization, has been studying development of the 5G communication system in terms of both the development of LTE/LTE-Advanced systems and a New Radio Access Technology (also referred to as New RAT or NR), which is a new method not necessarily backward compatible with the LTE/LTE-Advanced systems (see, e.g., Non Patent Literature (hereinafter referred to as "NPL") 1).

CITATION LIST

Non-Patent Literature

NPL 1
RP-181726, "Revised WID on New Radio Access Technology", NTT DOCOMO, September 2018
NPL 2
RP-193238, "New SID on Support of Reduced Capability NR Devices", Ericsson, December 2019

SUMMARY OF INVENTION

However, there is scope for study on a method for reducing a processing load of a terminal.

A non-limiting embodiment of the present disclosure facilitates providing a base station, a terminal, and a communication method each capable of reducing a processing load of a terminal.

A base station according to an embodiment of the present disclosure includes: control circuitry, which, in operation, generates a control signal related to a configuration of a first bandwidth part based on a parameter for which a number of candidates is less than that for a parameter of a second bandwidth part; and transmission circuitry, which, in operation, transmits the control signal.

It should be noted that general or specific embodiments may be implemented as a system, an apparatus, a method, an integrated circuit, a computer program, a storage medium, or any selective combination thereof.

According to an embodiment of the present disclosure, it is possible to reduce a processing load of a terminal.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF DRAWINGS

FIG. 6 illustrates an exemplary parameter of a frequency position;

FIG. 7 illustrates an exemplary parameter of a bandwidth;

FIG. 8 illustrates an exemplary parameter of subcarrier spacing;

FIG. 9 illustrates an exemplary parameter of a Control Resource Set (CORESET);

FIG. 10 illustrates an exemplary parameter of a Transmission Configuration Index (TCI) state;

DESCRIPTION OF EMBODIMENTS

Figure 1:
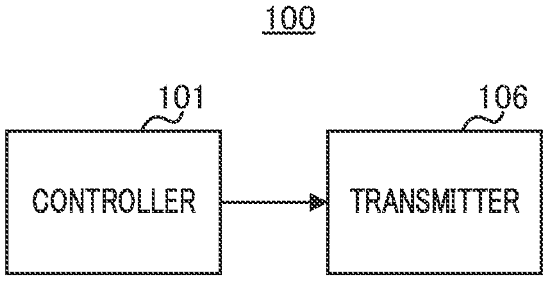
FIG. 1 is a block diagram illustrating an exemplary configuration of a part of a base station.

Hereinafter, embodiments of the present disclosure will be described in detail with reference to the accompanying drawings.

Note that, in the following description, a radio frame, a slot, and a symbol are each a physical resource unit in a time domain, for example. For example, the length of one frame may be 10 milliseconds. For example, one frame may be configured by a plurality (e.g., 10, 20, or another value) of slots. Further, for example, the number of slots configuring one frame may be variable depending on the slot length. Furthermore, for example, one slot may be configured by a plurality (e.g., 14 or 12) of symbols. For example, one symbol is the smallest physical resource unit in the time domain, and the symbol length may vary depending on the subcarrier spacing (SCS).

Further, a subcarrier and a resource block (RB) are each a physical resource unit in a frequency domain. For example, one resource block may be configured by 12 subcarriers. For example, one subcarrier may be the smallest physical resource unit in the frequency domain. The subcarrier spacing is variable, and may be 15 kHz, 30 kHz, 60 KHz, 120 KHz, 240 kHz, or another value.

[Bandwidth Part (BWP)]

In NR, for example, one BWP (e.g., bandwidth part) or a plurality of BWPs may be configured for a terminal (e.g., also referred to as a mobile station or User Equipment (UE)). For example, among a plurality of BWPs configured for the terminal, one or more BWPs may be activated. For example, the terminal may transmit and receive a radio signal in accordance with a parameter configured in a BWP that is activated at a certain time.

The parameter for configuring a BWP may include, for example, at least one of a frequency position, a bandwidth, SCS (subcarrier spacing), a CORESET, and a TCI state. For example, when a plurality of BWPs is configured for a terminal, different values are possibly configured individually for BWPs for the above-described parameters of the BWP.

Note that the CORESET is, for example, a parameter indicating a resource in which a downlink control channel (e.g., Physical Downlink Control Channel (PDCCH) is transmitted. For example, one or a plurality of CORESETs may be configured in each BWP. For example, one CORESET among a plurality of CORESETs configured in a BWP may be used at the time of transmission and reception.

Furthermore, the TCI state is, for example, a parameter one or a plurality of which can be configured in each BWP. For example, one TCI state among a plurality of TCI states configured in a BWP may be used at the time of transmission and reception. Transmission and reception whose TCI states are common can be herein regarded as having similar propagation path characteristics (in other words, Quasi-Colocation (QCL)).

[Reduced Capability NR Devices]

In Release 17 (hereinafter, referred to as Rel-17 NR), a specification (e.g., Reduced Capability (RedCap)) is expected to be developed for realizing a terminal (e.g., NR terminal) whose power consumption or cost is reduced by limiting some of the functions or performance to support various use cases, compared to Release 15 or 16 (hereinafter, referred to as Rel-15/16 NR) (e.g., initial release of NR) (e.g., see NPL 2).

Note that such a terminal is sometimes referred to as a reduced capability NR device, RedCap, a RedCap terminal, NR-Lite, or NR-Light, for example.

In order to reduce power consumption or cost, reduction in computational complexity in the terminal has been studied, for example. Further, reduction in the largest frequency bandwidth supported by the terminal has been studied, for example. For example, the largest frequency bandwidth supported by the terminal is possibly 20 MHz or 40 MHz in FR 1 (Frequency range 1), or 50 MHz or 100 MHz in FR 2 (Frequency range 2).

However, for example, when a plurality of BWPs is configured for a terminal, the terminal receives information on parameters such as a frequency position, a bandwidth, a SCS, a CORESET, and a TCI state, individually for the BWPs configured for the terminal, and thus, a processing load (e.g., computational complexity) of the terminal is likely to increase.

For example, in a case where SCS=15 KHz, assuming that 500 resource blocks (RB: Resource Block) are included in the system band of 100 MHz, the number of candidates for the frequency positions of the BWPs is possibly 500, and the number of candidates for the bandwidths of the BWPs is possibly 500. As described above, as the information amount of the control signal for indicating parameters of BWPs increases, the computational complexity in the terminal (e.g., processing amount for converting or recording the indicated parameters) possibly increases, and thus there is room for improvement on reducing the information amount of signaling (in other words, the computational complexity in the terminal).

In an embodiment of the present disclosure, for example, a method for reducing a processing load of a terminal will be described.

For example, in an embodiment of the present disclosure, a “simplified BWP” in which a configuration method differs from that of an existing BWP (for convenience, sometimes referred to as a “normal BWP”) corresponding to Rel-15/16 NR may be introduced. An information amount of control information on the simplified BWP may be less than the information amount of the control information on the normal BWP, for example. Thus, in the embodiment of the present disclosure, for example, the information amount on the parameters of the BWPs configured in terminal 200 is reduced, and the computational complexity on the configuration of the BPW in the terminal can be reduced, which results in reducing a processing load of the terminal.

[Overview of Communication System]

A communication system according to the present embodiment includes base station 100 and terminal 200.

FIG. 1 is a block diagram illustrating an exemplary configuration of a part of base station 100 according to the present embodiment. In base station 100 illustrated in FIG. 1, controller 101 (e.g., corresponding to control circuitry) generates a control signal related to a configuration of the first bandwidth part (e.g., a simplified BWP) based on a parameter for which the number of candidates is less than that for a parameter of the second bandwidth part (e.g., a normal BWP). Transmitter 106 (e.g., corresponding to transmission circuitry) transmits the control signal.

Figure 2:
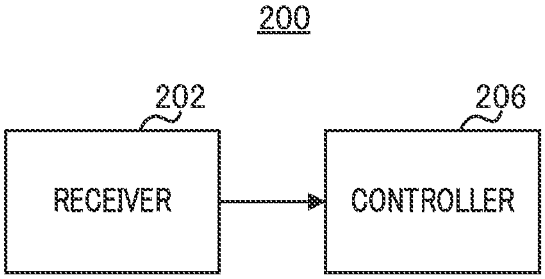
FIG. 2 is a block diagram illustrating an exemplary configuration of a part of a terminal.

FIG. 2 is a block diagram illustrating an exemplary configuration of a part of terminal 200 according to the embodiment. In terminal 200 illustrated in FIG. 2, receiver 202 (e.g., corresponding to reception circuitry) receives the control signal related to the configuration of the first bandwidth part (e.g., a simplified BWP) based on a parameter for which the number of candidates is less than that for a parameter of the second bandwidth part (e.g., a normal BWP). Controller 206 (e.g., corresponding to control circuitry) controls the configuration of the first bandwidth part based on the control signal.

[Configuration of Base Station]

Figure 3:
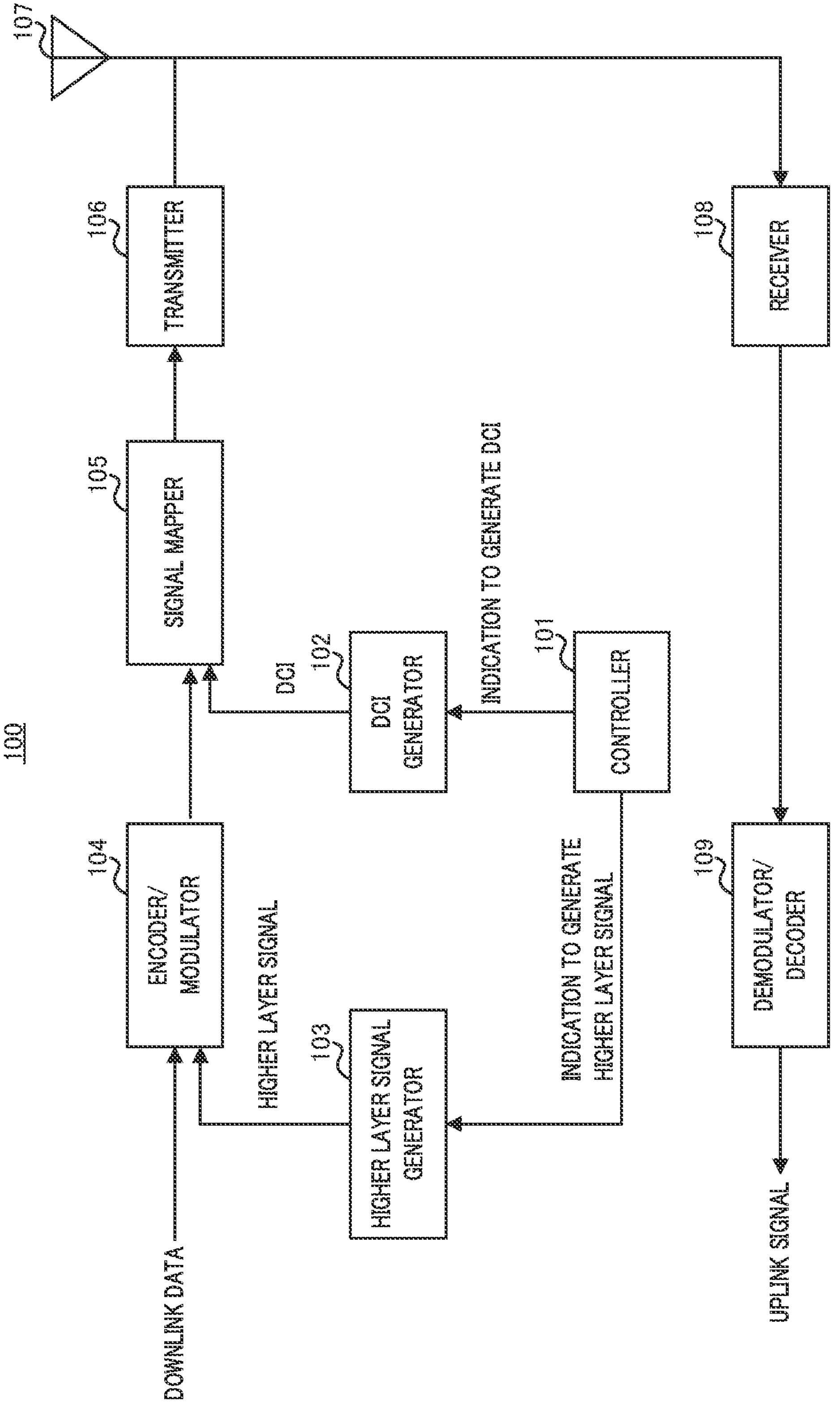
FIG. 3 is a block diagram illustrating an exemplary configuration of the base station.

FIG. 3 is a block diagram illustrating an exemplary configuration of base station 100 according to the present embodiment. In FIG. 3, base station 100 includes controller 101, Downlink Control Information (DCI) generator 102, higher layer signal generator 103, encoder/modulator 104, signal mapper 105, transmitter 106, antenna 107, receiver 108, and demodulator/decoder 109.

For example, controller 101 may determine a parameter of a BWP to be configured in terminal 200. The BWP configured in terminal 200 may include, for example, at least one of the above-described normal BWP and the simplified BWP. The parameter of the BWP may be indicated (or configured) to terminal 200 by at least one of a higher layer signal and DCI, for example. Controller 101 may indicate DCI generator 102 to generate downlink control information (e.g., DCI), and may indicate higher layer signal generator 103 to generate a higher layer signal (e.g., also referred to as a higher layer parameter or higher layer signaling), based on the determined parameter.

For example, DCI generator 102 may generate DCI based on an indication from controller 101 and output the generated DCI to signal mapper 105.

Higher layer signal generator 103 may generate a higher layer signal based on an indication from controller 101 and output the generated higher layer signal to encoder/modulator 104, for example.

Encoder/modulator 104 may, for example, perform error correction coding and modulation on the downlink data (e.g., Physical Downlink Shared Channel (PDSCH)) and the higher layer signal input from higher layer signal generator 103, and output the modulated signal to signal mapper 105.

For example, signal mapper 105 may map the DCI input from DCI generator 102 and the signal input from encoder/modulator 104 to resources. For example, signal mapper 105 may map the signal input from encoder/modulator 104 to a PDSCH resource and map the DCI to a PDCCH resource. Signal mapper 105 outputs the signal mapped to each resource to transmitter 106.

For example, transmitter 106 performs radio transmission processing including frequency conversion (e.g., up-conversion) using a carrier wave on the signal input from signal mapper 105, and outputs the signal after the radio transmission processing to antenna 107.

Antenna 107 radiates a signal (e.g., a downlink signal) input from transmitter 106 toward terminal 200, for example. Further, antenna 107 receives an uplink signal transmitted from terminal 200, and outputs the uplink signal to receiver 108, for example.

The uplink signal may be, for example, a signal of a channel such as an uplink data channel (e.g., physical uplink shared channel (PUSCH)), uplink control channel (e.g., physical uplink control channel (PUCCH)), or random access channel (e.g., physical random access channel (PRACH)).

For example, receiver 108 performs radio reception processing including frequency conversion (e.g., down-conversion) on the signal input from antenna 107, and outputs the signal after the radio reception processing to demodulator/decoder 109.

For example, demodulator/decoder 109 demodulates and decodes the signal input from receiver 108, and outputs the uplink signal.

[Configuration of Terminal]

Figure 4:
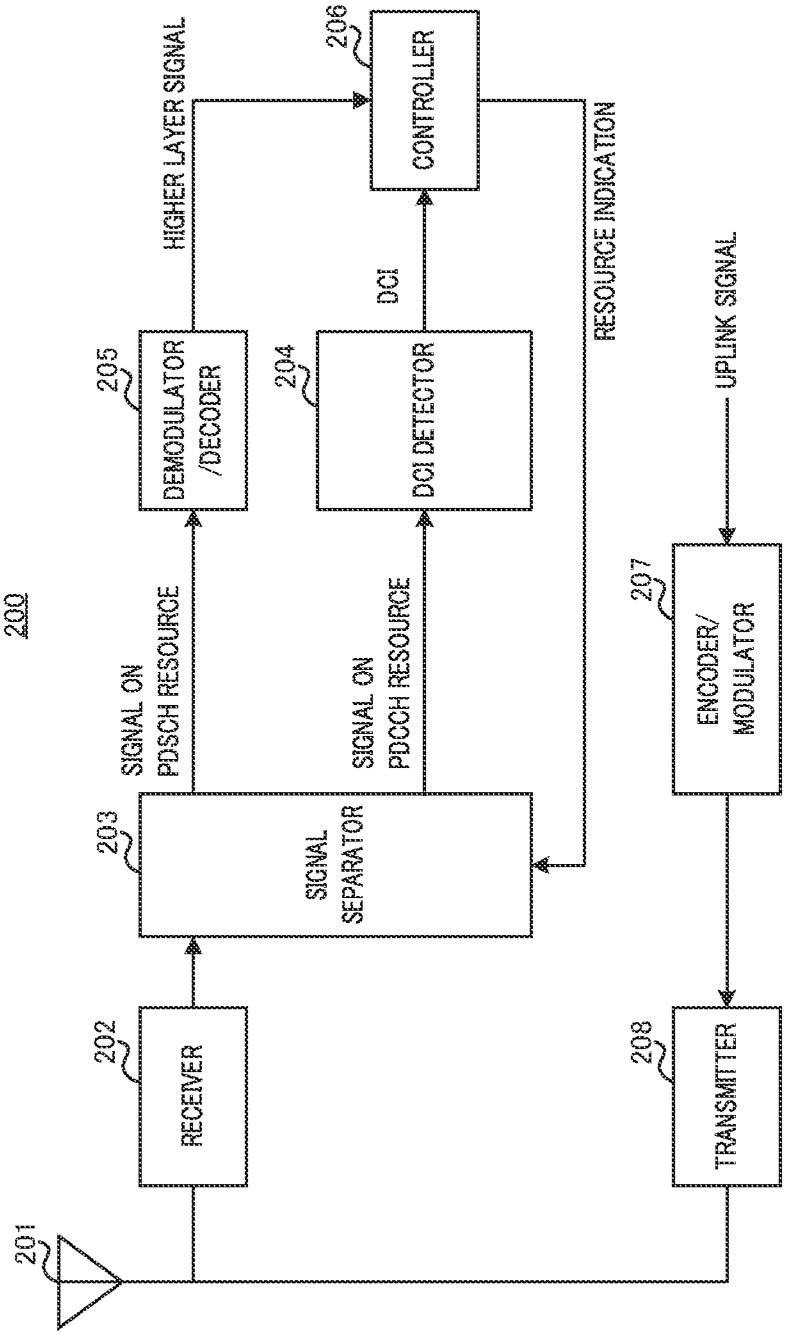
FIG. 4 is a block diagram illustrating an exemplary configuration of the terminal.

FIG. 4 is a block diagram illustrating an exemplary configuration of terminal 200 according to the present embodiment.

In FIG. 4, terminal 200 includes antenna 201, receiver 202, signal separator 203, DCI detector 204, demodulator/decoder 205, controller 206, encoder/modulator 207, and transmitter 208.

Antenna 201 receives a downlink signal transmitted by base station 100, and outputs the downlink signal to receiver 202. In addition, antenna 201 radiates an uplink signal input from transmitter 208 to base station 100.

For example, receiver 202 performs radio reception processing including frequency conversion (e.g., down-conversion) on the signal input from antenna 201, and outputs the signal after the radio reception processing to signal separator 203.

Signal separator 203 may identify a resource for each channel or signal based on at least one of pre-defined or pre-configured information and an indication on the resource input from controller 206, for example. For example, signal separator 203 extracts (in other words, separates) a signal mapped to the identified PDCCH resource, and outputs the signal to DCI detector 204. Further, signal separator 203 outputs, for example, a signal mapped to the identified PDSCH resource to demodulator/decoder 205.

For example, DCI detector 204 may detect DCI from the signal (e.g., signal on the PDCCH resource) input from signal separator 203. DCI detector 204 may output the detected DCI to controller 206, for example.

For example, demodulator/decoder 205 performs demodulation and error correction decoding on the signal (e.g., signal on the PDSCH resource) input from signal separator 203, and obtains at least one of downlink data and a higher layer signal. For example, demodulator/decoder 205 may output the higher layer signal obtained by decoding to controller 206.

For example, controller 206 may identify a PDSCH resource based on the DCI input from DCI detector 204 and output (in other words, indicate) information on the identified PDSCH resource to signal separator 203.

Further, controller 206 may control the configuration of a BWP (e.g., including a simplified BWP) based on at least one of the DCI input from DCI detector 204 and the higher layer signal input from demodulator/decoder 205, for example. For example, controller 206 may identify a parameter value for configuring a BWP (e.g., a simplified BWP or a normal BWP) based on at least one of the DCI and the higher layer signal. Then, controller 206 may configure the BWP based on the identified parameter of the BWP, for example.

Encoder/modulator 207 may, for example, perform encoding and modulation on an uplink signal (e.g., PUSCH, PUCCH or PRACH) and output the modulated signal to transmitter 208.

Transmitter 208 performs radio transmission processing including frequency conversion (e.g., up-conversion) on the signal input from encoder/modulator 207, and outputs the signal after the radio transmission processing to antenna 201, for example.

[Exemplary Operation of Base Station 100 and Terminal 200]

Next, an exemplary operation of base station 100 and terminal 200 described above will be described.

Operation Example 1

For example, for the BWP (normal BWP and simplified BWP) configured in terminal 200, a control signal related to parameters (e.g., referred to as parameter information) such as a frequency position, a bandwidth, SCS, a CORESET, and a TCI state may be indicated to terminal 200 by at least one of the higher layer signal and the DCI.

For example, the simplified BWP and the normal BWP may be different in the method for configuring a parameter.

For example, the number of candidates for the parameter of the simplified BWP may be less than that of the parameter of the normal BWP.

For example, the control signal related to the normal BWP may be information indicating the actual value of each parameter. On the other hand, for example, when there is a plurality of candidates for the configurable parameter value for the simplified BWP, the control signal may include information (e.g., identifier or index) identifying each of the plurality of candidates.

Further, for example, in parameters configuring the simplified BWP, when the number of candidates for the configurable parameter value is one, the parameter need not be included in the control signal.

According to these configurations of the control signal, the control signal related to the simplified BWP is configured with less information amount than the control signal related to the normal BWP, for example.

Figure 5:
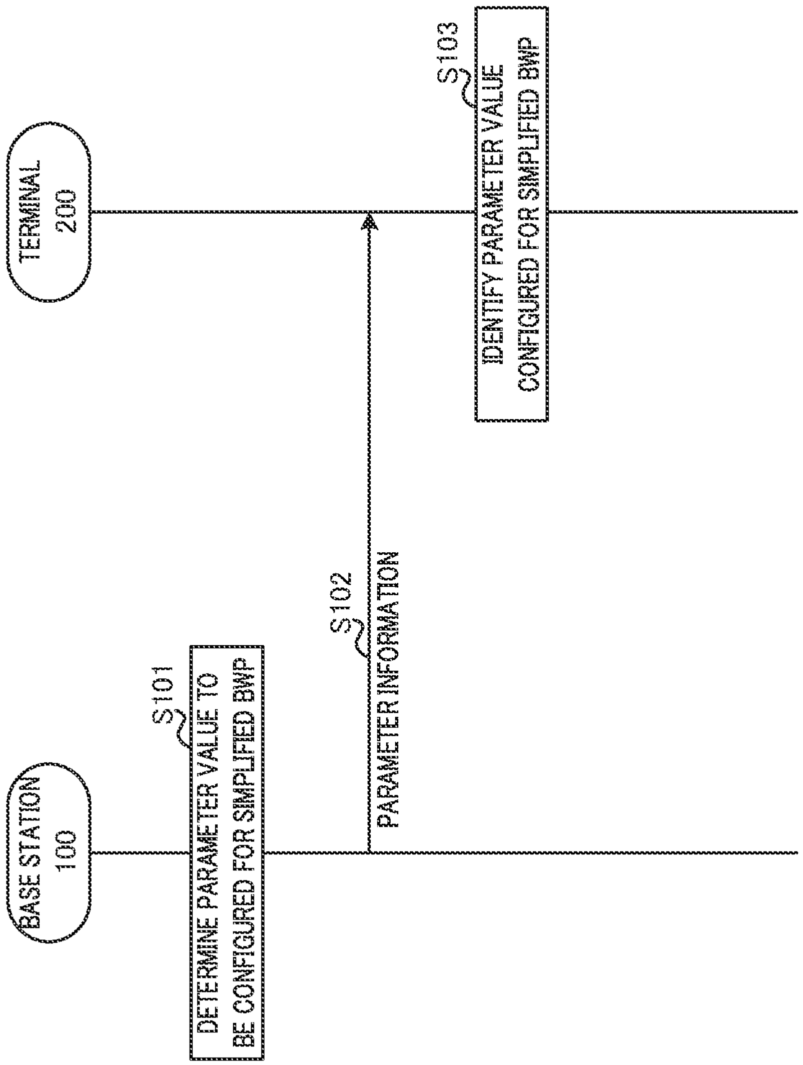
FIG. 5 is a sequence diagram illustrating an exemplary operation of the base station and the terminal.

FIG. 5 is a sequence diagram illustrating exemplary processing performed by base station 100 and terminal 200.

(S101)

Base station 100 may determine a value of the parameter (e.g., at least one of a frequency position, a bandwidth, SCS, a CORESET, and a TCI state) to be configured in one or a plurality of simplified BWPs to be configured in terminal 200, for example. For example, base station 100 may select an identifier (e.g., index) corresponding to a value to be configured in terminal 200 from a plurality of configurable candidates (e.g., a candidate list) for each parameter of the simplified BWP.

For example, FIGS. 6 to 10 illustrate relationships (e.g., candidate list) between a plurality of candidates for a frequency position (e.g., a common resource block or a carrier resource block (CRB) index), a bandwidth (BW), SCS, a CORESET (CORESET ID), and a TCI state (TCI state ID), respectively, and the indexes.

As illustrated in each of FIGS. 6 to 10, when there is a plurality of candidates for the parameter configuring the simplified BWP, base station 100 may select any one of indexes associated with the plurality of candidates for the parameter and indicate the selected index to terminal 200.

Further, when the number of candidates for the parameter is one (not illustrated) in at least one of the frequency position (CRB index), the bandwidth (BW), the SCS, CORESET(CORESET ID), and the TCI state (TCI state ID), the parameter need not be indicated from base station 100 to terminal 200 (in other words, need not be included in the control signal), and base station 100 need not select the candidate for the parameter.

Note that, for example, associations (e.g., candidate lists) between candidates for the parameter and identifiers (index) as illustrated in FIGS. 6 to 10 may be known between base station 100 and terminal 200. The associations between candidates for the parameter and identifiers as illustrated in FIGS. 6 to 10 may be defined in the standard, may be configured (e.g., pre-configured or configured) in terminal 200, or may be indicated to terminal 200 by at least one of the higher layer signal and the DCI.

For example, in the candidate list of the frequency position (CRB) of the BWP illustrated in FIG. 6, base station 100 may select any one of indexes 0 to 3. For example, the candidate for the frequency position may be determined based on the bandwidth (e.g., 20 MHz) supported by terminal 200. For example, in a case where SCS=15 kHz, the candidate for the frequency position may be selectable at intervals of approximately 20 MHz (100 RB) from CRB index 0 in the candidate list of the frequency position (e.g., CRB index) illustrated in FIG. 6. Note that, for example, when there is one candidate for the frequency position (not illustrated), base station 100 need not select the index corresponding to the frequency position and need not indicate it to terminal 200.

Further, for example, in the candidate list of the bandwidth of the BWP illustrated in FIG. 7, base station 100 may select index 0 or 1. For example, the candidate for the bandwidth may be determined based on the bandwidth (e.g., 20 MHz) supported by terminal 200. For example, in a case where SCS=15 kHz, 100 RBs (e.g., index 0) corresponding to approximately 20 MHz or 50 RBs (e.g., index 1) corresponding to half the bandwidth of 20 MHz may be selectable in the candidate list of the bandwidth illustrated in FIG. 7. Note that, for example, when there is one candidate for the bandwidth (not illustrated), base station 100 need not select the index corresponding to the bandwidth and need not indicate it to terminal 200.

Further, for example, in the candidate list of the SCS illustrated in FIG. 8, base station 100 may select index 0 or 1. For example, the candidate for the SCS may be determined based on a FR (FR: Frequency Range) to which the BWP belongs. For example, as illustrated in FIG. 8, in FR 1 (e.g., a band narrower than 6 GHZ), 15 kHz or 30 KHz may be selectable, and in FR 2 (e.g., a band equal to or wider than 6 GHz), 60 kHz or 120 KHz may be selectable. Note that, for example, when there is one candidate for the SCS (not illustrated), base station 100 need not select the index corresponding to the SCS and need not indicate it to terminal 200.

Furthermore, for example, in the candidate list of the CORESET (e.g., CORESET ID) illustrated in FIG. 9, base station 100 may select index 0 or 1. For example, the candidate for the CORESET may be determined based on the bandwidth (e.g., 20 MHz) supported by terminal 200. For example, the CORESET having a bandwidth equal to or narrower than the bandwidth (e.g., 20 MHz) (e.g., in a case where SCS=15 kHz, equal to or less than 100 RB) supported by terminal 200 may be selectable. Note that, for example, when there is one candidate for the CORESET (e.g., either set of CORESET ID=0 to 2 and 3 to 5, or any of CORESET=0 to 5) (not illustrated), base station 100 need not select the index corresponding to the CORESET and need not indicate it to terminal 200.

In addition, for example, in the candidate list of the TCI state (e.g., TCI state ID) illustrated in FIG. 10, base station 100 may select index 0 or 1. For example, the candidate for the TCI state may be determined based on a reference signal that has been received by terminal 200 thus far. For example, the TCI state corresponding to the reference signal that has been received by terminal 200 thus far may be selectable. The reference signal may be, for example, a Primary Synchronization Signal (PSS), a Secondary Synchronization Signal (SSS), or a Channel State Information-Reference Signal (CSI-RS). Note that, for example, when there is one candidate for the TCI state (not illustrated), base station 100 need not select the index corresponding to the TCI state and need not indicate it to terminal 200.

Note that the associations (e.g., the candidate lists) between the candidates for the parameters illustrated in FIGS. 6 to 10 and the identifiers are merely examples, and the identifiers and the values of candidates for the parameters are not limited thereto. Further, for example, the numbers of candidates for parameters of the BWP are not limited to those illustrated in FIGS. 6 to 10, and the numbers of candidates for the parameters may be other values. Furthermore, the numbers of candidates may be different between the parameters. In addition, in FIGS. 6 to 10, a format in which the candidate for the parameter is associated with the identifier has been described, but is not limited thereto, and the candidate for the parameter may be indicated to terminal 200 with another format. Moreover, a combination of a plurality of parameters (e.g., a combination of the frequency position and the bandwidth) may be indicated by one value or identifier.

(S102)

In FIG. 5, base station 100 may transmit, to terminal 200, a control signal (e.g., including information that includes the selected identifier) related to the simplified BWP determined in the process of S101. Terminal 200 receives, for example, the control signal transmitted from base station 100.

(S103)

For example, terminal 200 may identify the parameter value of the simplified BWP to be configured in terminal 200 based on the received control signal (e.g., identifier included in the control signal).

Further, for example, terminal 200 may configure a defined value for a parameter that is not indicated from base station 100 (e.g., a parameter of which the number of candidates is one). For example, when the information on the parameter of the bandwidth is not indicated from base station 100, terminal 200 may configure (in other words, may regard) the bandwidth of the simplified BWP to be a defined value (e.g., 100 RB).

For example, terminal 200 may configure the simplified BWP to be configured in terminal 200 based on the identified value.

In Operation Example 1, base station 100 indicates, to terminal 200, a control signal (identifier) related to a simplified BWP based on an association (e.g., candidate list) between candidates for a parameter configuring the simplified BWP and an identifier. Further, terminal 200 determines the parameter of the simplified BWP to be configured in terminal 200 based on the identifier included in the control signal indicated from base station 100.

As described above, in Operation Example 1, by indicating a candidate for a parameter configuring a simplified BWP, information indicating any of candidates whose number is less than the number of candidates for the parameter of a normal BWP is indicated, and thus information amount of a control signal can be reduced compared with the normal BWP. Further, for example, by indicating an identifier corresponding to the parameter of the simplified BWP, the number of bits representing the indicated information can be reduced as compared with the indication of the candidate value (actual value) for the parameter, so that the information amount of the control signal can be reduced. Therefore, in Operation Example 1, the information amount of the control signal related to the simplified BWP indicated from base station 100 to terminal 200 is less than the information amount of the control signal related to the normal BWP.

Further, in Operation Example 1, when there is one candidate for the parameter of the simplified BWP, base station 100 does not include the parameter in the control signal (in other words, does not indicate the parameter).

As described above, according to Operation Example 1, the information amount of the control signal related to the BWP (e.g., simplified BWP) configured in terminal 200 can be reduced, and therefore, the computational complexity for the BWP configuration (identification) in terminal 200 can be reduced.

Operation Example 2

In Operation Example, 2, for example, a common value may be configured for a parameter of each of a plurality of simplified BWPs to be configured in terminal 200.

As an example, Operation Example 2 will be described with reference to a sequence diagram illustrated in FIG. 5 describing processing of base station 100 and terminal 200.

(S101)

For example, base station 100 may determine a value of a parameter (e.g., at least one of a frequency position, a bandwidth, SCS, a CORESET, and a TCI state) configured in the plurality of simplified BWPs to be configured in terminal 200. For example, base station 100 may configure a value common between the plurality of BWPs for a parameter of at least one of the frequency position, the bandwidth, the SCS, the CORESET, and the TCI state. For example, the parameter for which a common value is configured between the plurality of simplified BWPs may be defined in the standard, pre-configured in terminal 200, or indicated to terminal 200 with a control signal.

(S102)

Base station 100 may transmit, to terminal 200, the control signal related to the simplified BWP determined in the process of S101. The parameter for which a common value is configured between the plurality of simplified BWPs may be herein indicated, for example, in one information field (in other words, a common information field). In other words, the parameter for which a common value is configured between the plurality of simplified BWPs need not be individually indicated (in other words, need not be indicated one by one) to the plurality of simplified BWPs.

Terminal 200 receives, for example, the control signal transmitted from base station 100.

(S103)

For example, terminal 200 may identify the parameter value of the simplified BWP to be configured in terminal 200 based on the received control signal. For example, terminal 200 may configure the value common between the plurality of simplified BWPs to be configured in terminal 200 in a certain parameter (e.g., a defined or configured parameter or an indicated parameter). For example, terminal 200 may configure the simplified BWP to be configured in terminal 200, based on the identified value.

In Operation Example 2, base station 100 configures a common value in at least one of the parameters configuring the plurality of simplified BWPs, and indicate the value to terminal 200. In addition, terminal 200 configures at least one of the parameters of the plurality of BWPs based on the common value included in the control signal indicated from base station 100.

For example, in Operation Example 2, at least one of the parameters configuring the simplified BWP is common between the plurality of simplified BWPs, and therefore, the information amount on the plurality of simplified BWPs indicated from base station 100 to terminal 200 is less than that when the respective parameters of the plurality of BWPs are individually indicated. For example, in Operation Example 2, the information amount of the control signal related to the simplified BWP indicated from base station 100 to terminal 200 is less than the information amount of the control signal related to the normal BWP.

Thus, according to Operation Example 2, the information amount of the control signal related to the BWP (e.g., simplified BWP) configured in terminal 200 can be reduced, so that the computational complexity for the BWP configuration (identification) in terminal 200 can be reduced.

Note that, in Operation Example 2, a parameter for which a value common between a plurality of BWPs (e.g., simplified BWPs) is configured may be at least one of a frequency position, a bandwidth, SCS, a CORESET, and a TCI state, for example.

For example, between a plurality of BWPs, common values may be configured in the parameters of the bandwidth, the SCS, the CORESET, and the TCI state, and a common value need not be configured in the parameter of the frequency position (in other words, an individual value may be configured for each BWP). This can enhance the flexibility of the configuration of the frequency position of the BWPs, and can reduce the information amount of the control signal related to the BWPs.

Alternatively, between a plurality of BWPs, common values may be configured for the parameters of the bandwidth, the SCS, and the TCI state, and common values need not be configured in the parameters of the frequency position and the CORESET (in other words, an individual value may be configured for each BWP). As described above, by configuring common values in parameters such as the bandwidth, the SCS, and the TCI state, which require long time to be changed (or converted) in terminal 200 compared to the frequency position and the CORESET, the time for BWP switching can be shortened, and the flexibility of the configuration of the frequency position and the CORESET can be enhanced.

Note that a combination of parameters for which values common between a plurality of BWPs are configured and parameters for which an individual value is configured for each of the plurality of BWPs is not limited to the above-described examples.

Further, for the parameter whose value is common between a plurality of simplified BWPs, base station 100 may indicate the parameter to terminal 200 with a method of configuring a value in one BWP among the plurality of simplified BWPs. In this method, terminal 200 may identify that, for the parameter for which a value is configured in one BWP and no value is configured in other BWPs, the value is common between the plurality of simplified BWPs.

Alternatively, for example, base station 100 may indicate, to terminal 200, a parameter whose value is common between simplified BWPs, in an information field common to the plurality of simplified BWPs (e.g., BWP common field). In other words, base station 100 may, for example, indicate, to terminal 200, a parameter configured individually for each of a plurality of simplified BWPs, in an information field specific to each of the plurality of simplified BWPs (e.g., BWP specific field). For example, terminal 200 may obtain the parameter commonly configured in the plurality of BWPs in an information field common to the BWPs in a control signal and obtain the parameter individually configured for each of the plurality of BWPs in an information field specific to each of the BWPs in the control signal.

The exemplary operation of base station 100 and terminal 200 has been described above.

As described above, in the present embodiment, base station 100 generates a control signal related to a configuration of a simplified BWP based on a parameter for which the number of candidates is less than that for the parameter of a normal BWP, and transmits the control signal. Further, terminal 200 receives the control signal related to the configuration of the simplified BWP, and controls the configuration of the simplified BWP based on the received control signal.

For example, introducing the simplified BWP allows terminal 200 to configure the simplified BWP with a control signal whose information amount is less than that of the normal BWP, and thus the processing amount for the configuration (e.g., converting or recording of an indication parameter) of the simplified BWP in terminal 200 can be reduced. Therefore, according to the present embodiment, for example, even in a case where a plurality of BWPs is configured in terminal 200 to which RedCap is applied, the computational complexity in terminal 200 can be reduced.

The embodiment of the present disclosure has been described above.

OTHER EMBODIMENTS

Combination of Operation Example 1 and Operation Example 2

Operation Example 1 and Operation Example 2 may be combined. For example, for a certain parameter (e.g., frequency position) of a simplified BWP, base station 100 may transmit, to terminal 200, an identifier corresponding to a candidate value individual for the simplified BWP as in Operation Example 1, and for other parameters (e.g., bandwidth, SCS CORESET, and TCI state), base station 100 may indicate, to terminal 200, a value common to a plurality of simplified BWPs as in Operation Example 2.

Note that, among the parameters of the simplified BWP, the parameter to which Operation Example 1 is applied and the parameter to which Operation Example 2 is applied are not limited to the above-described example.

A combination of Operation Example 1 and Operation Example 2 can enhance the flexibility of the parameter configuration of the simplified BWP.

Further, the parameter value configured in a plurality of simplified BWPs as in Operation Example 2 may be the same as a configuration value (e.g., the actual parameter value) of a normal BWP, or may be a value (e.g., index) having a less information amount (e.g., the number of candidates) than the normal BWP as in Operation Example 1, for example.

(Selection of SCS)

In the selection of the SCS in the above-described embodiment, one of 15 kHz and 30 kHz may be selected in FR1 (frequency range 1), and one of 60 kHz and 120 KHz may be indicated in FR2 (frequency range 2) in which a wide band is easily secured compared with FR1. This selection of the SCS results in selecting SCS suitable for each frequency. Note that the correspondence relationship between FR1 and FR2 and SCS is not limited to the above-described example.

(Selection of CORESET)

In the selection of the CORESET in the above-described embodiment, the bandwidth of the selected CORESET may be, for example, the same as the bandwidth of the simplified BWP indicated to terminal 200, or may be narrower than the bandwidth of the simplified BWP. This selection of the CORESET can configure the CORESET whose bandwidth is suitable for terminal 200.

Alternatively, the bandwidth of the CORESET may be wider than the bandwidth of the simplified BWP indicated to terminal 200, for example. This selection of the CORESET enables a flexible operation of the CORESET.

(Selection of Bandwidth)

In the above embodiment, the bandwidth of the simplified BWP may be, for example, the bandwidth supported by terminal 200 (e.g., 20 MHz or 40 MHz in FR1 or 50 MHz or 100 MHz in FR2). This selection of the bandwidth can make the maximum use of the bandwidth supported by terminal 200.

Alternatively, the value of the bandwidth of the simplified BWP may be, for example, a bandwidth narrower or wider than the bandwidth supported by terminal 200. This selection of the bandwidth enables a flexible operation of the BWP.

(Selection of Frequency Position)

In the above-described embodiment, the value of the frequency position may be, for example, a value corresponding to any frequency in a band occupied by the simplified BWP. For example, the value of the frequency position may be at least one of the lowest frequency, the center frequency, or the highest frequency of the band occupied by the simplified BWP. Alternatively, the value of the frequency position may be an identifier (index) of a frequency resource (e.g., RB or subcarrier) corresponding to a frequency within the band occupied by the simplified BWP.

Further, in the above-described embodiment, the number of candidates for the frequency position of the simplified BWP may be equal to or less than a certain number (e.g., expressed as "$N_{freq\text{-}pos}$"). $N_{freq\text{-}pos}$ may be determined based on, for example, a carrier bandwidth (hereinafter, referred to as a "carrier BW") and a bandwidth supported by terminal 200 (hereinafter, referred to as a "UE BW"). For example, $N_{freq\text{-}pos}$ may be determined based on the following Equation 1:

$$N_{freq\text{-}pos} = \text{floor}\left(\frac{\text{carrier } BW}{UE\ BW}\right) \quad \text{(Equation 1)}$$

Note that, in Equation 1, the function floor(x) is a function that returns the largest value among integers equal to or less than x.

For example, when the carrier bandwidth (carrier BW)=80 MHz and the bandwidth of terminal 200 (UE BW)=20 MHZ, $N_{freq\text{-}pos}$ may be 4. This selection of the frequency position results in an appropriate configuration of the parameter of the simplified BWP for the carrier bandwidth and the bandwidth of terminal 200.

Figure 11:
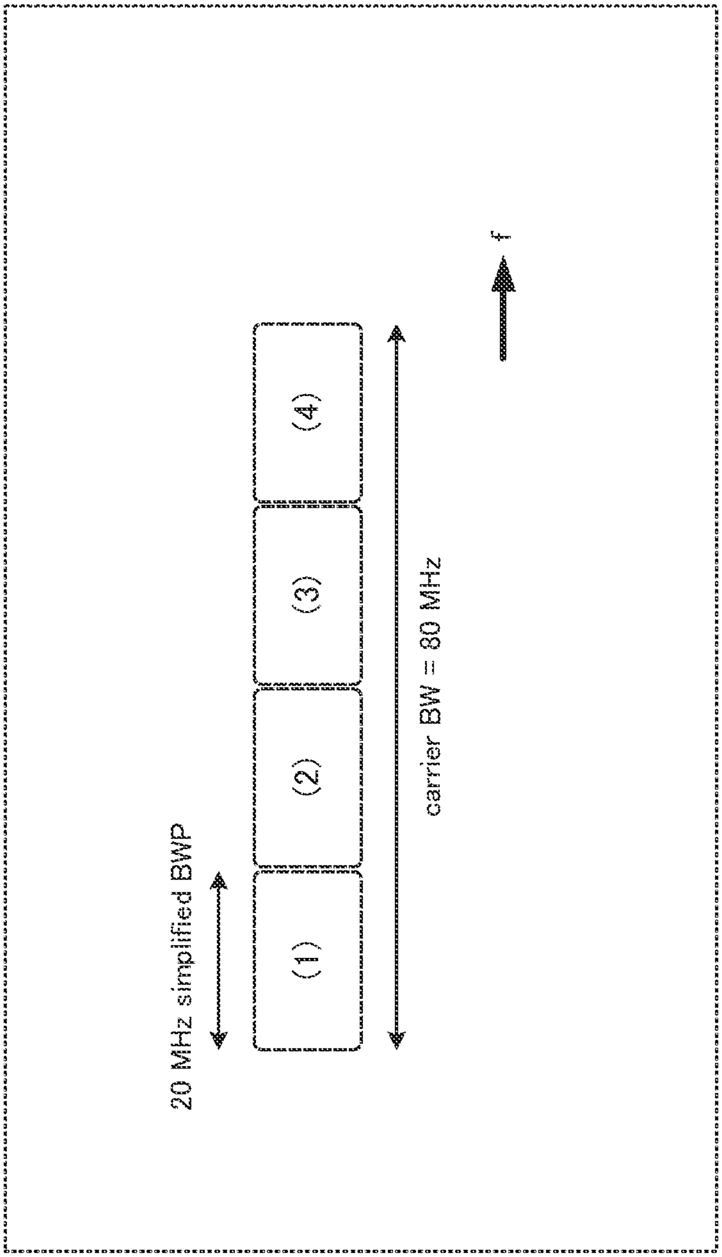
FIG. 11 illustrates an exemplary configuration of a BWP.

The interval between the candidates for the frequency position may be, for example, a bandwidth (e.g., 20 MHz) supported by terminal 200. For example, as illustrated in FIG. 11, the candidates for the frequency position of the simplified BWP for the carrier bandwidth (80 MHz) may be configured at intervals of bandwidth (e.g., 20 MHz) units supported by terminal 200. For example, as illustrated in FIG. 11, a plurality of simplified BWPs may be configured so that the bands of the plurality of simplified BWPs do not overlap each other in the carrier bandwidth. This selection of the frequency position can reduce the number of candidates for the frequency position of the simplified BWP, and can enhance the frequency selectivity between the simplified BWPs.

Further, in the above-described embodiment, $N_{freq\text{-}pos}$, which is the number of candidates for the frequency position of the simplified BWP, may be determined based on at least one of a carrier bandwidth (e.g., 20 MHz), a size of an RB, and a channel raster (e.g., a channel raster spacing), for example. For example, $N_{freq\text{-}pos}$ may be determined based on the following equation (2):

$$N_{freq\text{-}pos} = \text{floor}\left(\frac{\text{carrier } BW}{\text{new spacing}}\right) \quad \text{(Equation 2)}$$

In Equation 2, new spacing may be a common multiple (e.g., the least common multiple) of the size of the RB and the channel raster spacing.

For example, when the size of the RB is 180 kHz and the channel raster spacing is 100 KHz, new spacing may be set to 900 kHz, which is the least common multiple. In this case, in Equation 2, $N_{freq\text{-}pos}$=22.

Further, the interval between the frequency positions of the simplified BWP may be a multiple of new spacing. Furthermore, the frequency position of the simplified BWP may be configured so that the center frequency of the simplified BWP and the channel raster match with each other. Thus, the number of candidates for the frequency position of the simplified BWP can be reduced, and the orthogonality between the signal in the simplified BWP and the signal mapped on the channel raster can be maintained.

Note that the channel raster spacing is not limited to 100 kHz, and may be 15 kHz, 60 KHz or another value. Further, the size of the RB is not limited to 180 kHz, and may be another value. Furthermore, the carrier bandwidth and the bandwidth supported by terminal 200 are not limited to the above-described examples, and may be other values.

In addition, the value of $N_{freq\text{-}pos}$ or new spacing may be different values between the simplified BWPs. Thus, the flexibility of the configuration of the simplified BWPs can be enhanced.

Further, $N_{freq\text{-}pos}$ may be determined based on, for example, a carrier bandwidth (carrier BW). For example, as the carrier bandwidth is widened, $N_{freq\text{-}pos}$ may be set to a greater value.

Furthermore, $N_{freq\text{-}pos}$ may be determined based on, for example, a bandwidth (e.g., UE BW) of terminal 200. For example, as the bandwidth (UE BW) of terminal 200 is widened. $N_{freq\text{-}pos}$ may be set to a smaller value.

Moreover, $N_{freq\text{-}pos}$ may be determined based on, for example, a size of an RB. For example, as the size of the RB is reduced, $N_{freq\text{-}pos}$ may be set to a greater value.

In addition, $N_{freq\text{-}pos}$ may be determined based on, for example, channel raster spacing. For example, as the channel raster spacing becomes narrower, $N_{freq\text{-}pos}$ may be set to a greater value.

Further, in the above-described operation examples, the frequency position of the simplified BWP may be determined based on at least one of a carrier bandwidth (carrier B), a bandwidth of terminal 200, the size of the RB, and the channel raster spacing.

(Configuration of BWP)

In the above embodiment, for example, one or a plurality of normal BWPs and one or a plurality of simplified BWPs may be configured for a RedCap terminal. This BWP configuration enables, for the RedCap terminal, a more stable operation in which the computational complexity of the RedCap terminal is reduced by the simplified BWP while the normal BWP is utilized.

Further, for example, for a RedCap mobile station, no normal BWP may be configured, and one or a plurality of simplified BWPs may be configured. This BWP configuration can reduce the computational complexity of the RedCap mobile station.

Furthermore, for example, one or a plurality of simplified BWPs may be configured for a non RedCap terminal. Alternatively, one or a plurality of simplified BWPs may be configured for terminal 200 using a specific frequency band such as FR2 or terminal 200 for a specific use case. This BWP configuration can reduce the computational complexity of the non RedCap terminal or terminal 200 for a specific frequency band or use case.

(BWP Switching)

In the above-described embodiments, terminal 200 may activate another BWP that differs from the active BWP in accordance with an indication or the like from base station 100, for example. In other words, terminal 200 may switch the active BWP. This BWP switching (e.g., also referred to as retuning) may be switching between simplified BWPs or switching between a simplified BWP and a normal BWP.

Further, in the BWP switching, a time resource before and after the switching timing may be configured in a guard period (the name is exemplary), and transmission and reception of a signal assigned to the resource may be omitted. For example, in a case of switching from BWP #1 to BWP #2, transmission and reception of signals in several symbols or a slot immediately before the switching in BWP #1 may be omitted, or transmission and reception of signals in several symbols or a slot immediately after the switching in BWP #2 may be omitted. Alternatively, signals in both the time resource immediately before the switching in BWP #1 and the time resource immediately after the switching in BWP #2 may be omitted.

In the above-described BWP switching, a signal to be omitted (e.g., BWP in which a signal is to be omitted) may be determined according to some criteria. For example. transmission and reception of a signal satisfying at least one of the following criterion may be omitted.

(1) A data signal, a control signal (e.g., signal of common search space or UE-specific search space), or a reference signal (2) A downlink signal or an uplink signal (3) An orthogonal sequence (e.g., Orthogonal Cover Code (OCC)) is not applicable For example, in a case where the signals before or after the BWP switching are a downlink control signal and a downlink data signal, transmission and reception of the downlink data signal may be omitted when the control signal is a signal in Common search space, and transmission and reception of the downlink control signal may be omitted when the control signal is a signal in UE-specific search space. This allows transmission and reception of a signal having high importance without omitting it. Note that an exemplary configuration of the importance (or priority) between signal types (e.g., a data signal, a control signal, or a reference signal) is not limited to the above example.

Further, in the BWP switching, for example, a control signal and a data signal may be assigned to a time resource different from the guard period described above. In this case, rate-matching may be applied to the control signal and the data signal. Further, for example, the application of rate-matching may be indicated to terminal 200. Further, for example, base station 100 may configure search space so as to assign a downlink signal to a time resource different from the guard period, or terminal 200 may determine that a time resource to which the control signal is assigned has been shifted.

(Default BWP)

In the above embodiment, one BWP of a normal BWP and a simplified BWP may be configured as a default BWP. For example, when a condition of passing a certain period of time is satisfied, the default BWP may be activated (or fallbacked).

Further, for example, a normal BWP may be configured as a default BWP. In this case, even when a simplified BWP is active, a normal BWP that is a default BWP may be activated when a condition of passing a certain period of time is satisfied. This enables a more stable operation utilizing a normal BWP.

(Parameter of BWP)

In the above-described embodiment, a frequency position, a bandwidth, SCS (subcarrier spacing), a CORESET, and a TCI state have been described as exemplary parameters configuring a BWP, but the parameter configuring a BWP may be at least one of these parameters, another parameter in place of at least one of these parameters, or another parameter added to at least one of these parameters.

(Terminal Type and Identification)

The above-described embodiments may be applied to, for example, a "RedCap terminal" or a non RedCap terminal.

Note that the RedCap terminal may be, for example, a terminal having at least one of the following characteristics (in other words, attributes or capabilities).

(1) A terminal that indicates (e.g., report), to base station 100, that the terminal is "a terminal targeted for coverage enhancement", "a terminal that receives a signal repeatedly transmitted", or "a RedCap terminal". Note that, for the above-described indication (report), an uplink channel such as a PRACH and a PUSCH or an uplink signal such as a Sounding Reference Signal (SRS) may be used, for example.

(2) A terminal having at least one of the following capabilities, or a terminal reporting at least one of the following capabilities to base station 100. Note that, for the above-described report, an uplink channel such as a PRACH and a PUSCH or an uplink signal such as a UCI or an SRS may be used, for example.

- A terminal whose supportable frequency bandwidth is equal to or less than a threshold value (e.g., 20 MHz, 40 MHz, or 100 MHz)
- A terminal in which the number of implemented reception antennae is equal to or less than a threshold value (e.g., threshold=1)
- A terminal in which the number of supportable downlink ports (e.g., the number of reception antenna ports) is equal to or less than a threshold value (e.g., threshold value=2)
- A terminal in which the number of supportable number of transmission ranks (e.g., the number of maximum Multiple-Input Multiple-Output (MIMO) layers (or the number of ranks) is equal to or less than a threshold value (e.g., threshold value=2)
- A terminal capable of transmitting and receiving a signal in a frequency band equal to or higher than a threshold value (e.g., Frequency Range 2 (FR2) or a band equal to or higher than 52 GHz)
- A terminal whose processing time is equal to or longer than a threshold value
- A terminal in which the available transport block size (TBS) is equal to or less than a threshold value
- A terminal in which the number of available transmission ranks (e.g., the number of MIMO transmission layers) is equal to or less than a threshold value.
- A terminal whose available modulation order is equal to or less than a threshold value
- A terminal in which the number of available Hybrid Automatic Repeat request (HARQ) processes is equal to or less than a threshold value
- A terminal that supports Rel-17 NR or later release (3) A terminal to which a parameter corresponding to a RedCap mobile station is indicated from base station 100. Note that the parameter corresponding to the RedCap mobile station may include, for example, a parameter such as a Subscriber Profile ID for RAT/Frequency Priority (SPID).

Note that the "non RedCap terminal" may mean, for example, a terminal that supports Rel-15/16 (e.g., a terminal that does not support Rel-17) or a terminal that does not have the above-described characteristics even though the terminal supports Rel-17.

(Type of BWP)

In the above-described embodiment, the "second bandwidth part" or the "normal BWP" may mean a BWP defined in Rel-15/16, or a BWP that is defined in Rel-17 or a later release and to which the method described in the above-described embodiment is not applied.

In the above-described embodiment, when SCS=15 kHz. the number of RBs corresponding to approximately 20 MHz is 100, but may be other than 100.

Further, any component termed with a suffix, such as "-er," "-or," or "-ar" in the above-described embodiments may be replaced with other terms such as "circuit (circuitry)," "device," "unit," or "module."

(Supplement)

Information indicating whether terminal 200 supports the functions, operations, or processes described in the above-described embodiments may be transmitted (or indicated) from terminal 200 to base station 100 as capability information or a capability parameter of terminal 200.

The capability information may include an information element (IE) individually indicating whether terminal 200 supports at least one of the functions, operations, or processes described in the above-described embodiments. Alternatively, the capability information may include an information element indicating whether terminal 200 supports a combination of any two or more of the functions, operations, or processes described in the above-described embodiments, modifications, and supplements.

Base station 100 may determine (or assume) the function, operation, or process supported (or not supported) by terminal 200 of the transmission source of the capability information, based on the capability information received from terminal 200, for example. Base station 100 may perform an operation, processing, or control corresponding to a determination result based on the capability information. For example, base station 100 may determine a parameter (e.g., a parameter for configuring a simplified BWP) to be indicated to terminal 200, based on the capability information received from terminal 200.

Note that the fact that terminal 200 does not support some of the functions, operations, or processes described in the above-described embodiments may be read as that some of the functions, operations, or processes are limited in terminal 200. For example, information or a request on such limitation may be indicated to base station 100.

Information on the capability or limitation of terminal 200 may be defined, for example, in the standard, or may be implicitly indicated to base station 100 in association with information known to base station 100 or information transmitted to base station 100.

(Control Signal)

In the present disclosure, the downlink control signal (or downlink control information) relating to the exemplary embodiment of the present disclosure may be a signal (or information) transmitted in a Physical Downlink Control Channel (PDCCH) in a physical layer, for example, or may be a signal (or information) transmitted in a Medium Access Control Control Element (MAC CE) or Radio Resource Control (RRC) in a higher layer. Further, the signal (or information) is not limited to that indicated by the downlink control signal, but may be predefined in the specifications (or standard) or may be pre-configured for the base station and the terminal.

In the present disclosure, the uplink control signal (or uplink control information) relating to the exemplary embodiment of the present disclosure may be, for example, a signal (or information) transmitted in a PUCCH of the physical layer or a signal (or information) transmitted in the MAC CE or RRC of the higher layer. In addition, the signal (or information) is not limited to a case of being indicated by the uplink control signal and may be previously specified by the specifications (or standards) or may be previously configured in a base station and a terminal. Further, the uplink control signal may be replaced with, for example, uplink control information (UCI), 1st stage sidelink control information (SCI), or 2nd stage SCI.

(Base Station)

In the above embodiments, the base station may be a transmission reception point (TRP), a clusterhead, an access point, a remote radio head (RRH), an eNodeB (eNB), a gNodeB (gNB), a base station (BS), a base transceiver station (BTS), a base unit, or a gateway, for example. Further, in side link communication, a terminal may play a role of a base station. Furthermore. instead of the base station, a relay apparatus that relays communication between a higher node and a terminal may be used. Moreover, a road side device may be used.

(Uplink/Downlink/Sidelink)

An exemplary embodiment of the present disclosure may be applied to, for example, any of an uplink, a downlink, and a sidelink. For example, an exemplary embodiment of the present disclosure may be applied to an uplink Physical Uplink Shared Channel (PUSCH), Physical Uplink Control Channel (PUCCH), or Physical Random Access Channel (PRACH), a downlink Physical Downlink Shared Channel (PDSCH), PDCCH, or Physical Broadcast Channel (PBCH), or a sidelink Physical Sidelink Shared Channel (PSSCH), Physical Sidelink Control Channel (PSCCH), or Physical Sidelink Broadcast Channel (PSBCH).

Note that the PDCCH, the PDSCH, the PUSCH, and the PUCCH are examples of a downlink control channel, a downlink data channel, an uplink data channel, and an uplink control channel, respectively. Further, the PSCCH and the PSSCH are examples of a side link control channel and a side link data channel, respectively. Further, the PBCH and PSBCH are examples of a broadcast channel, and the PRACH is an example of a random access channel.

(Data Channel/Control Channel)

An exemplary embodiment of the present disclosure may be applied to, for example, any of a data channel and a control channel. For example, a channel in an exemplary embodiment of the present disclosure may be replaced with any one of the PDSCH, the PUSCH, and the PSSCH being the data channels, or the PDCCH, the PUCCH, the PBCH, the PSCCH, and the PSBCH being the control channels.

(Reference Signal)

In an exemplary embodiment of the present disclosure, a reference signal is a signal known to both a base station and a mobile station and may also be referred to as a reference signal (RS) or a pilot signal. The reference signal may be any of a Demodulation Reference Signal (DMRS), a Channel State Information-Reference Signal (CSI-RS), a Tracking Reference Signal (TRS), a Phase Tracking Reference Signal (PTRS), a Cell-specific Reference Signal (CRS), or a Sounding Reference Signal (SRS).

(Time Intervals)

In an embodiment of the present disclosure, time resource units are not limited to one or a combination of slots and symbols, and may be time resource units, such as frames, superframes, subframes, slots, time slot subslots, minislots, or time resource units, such as symbols, orthogonal frequency division multiplexing (OFDM) symbols, single carrier-frequency division multiplexing access (SC-FDMA) symbols, or other time resource units. The number of symbols included in one slot is not limited to any number of symbols exemplified in the embodiments described above, and may be other numbers of symbols.

(Frequency Band)

An exemplary embodiment of the present disclosure may be applied to either a licensed band or an unlicensed band. A channel access procedure (Listen Before Talk (LBT), carrier sense, and/or Channel Clear Assessment (CCA)) may be performed prior to transmission of each signal.

(Communication)

An exemplary embodiment of the present disclosure may be applied to any of communication between a base station and a terminal (Uu link communication), communication between a terminal and a terminal (Sidelink communication), and communication of a Vehicle to Everything (V2X). For example, the channel in an exemplary embodiment of the present disclosure may be replaced with the PSCCH, the PSSCH, the Physical Sidelink Feedback Channel (PSFCH), the PSBCH, the PDCCH, the PUCCH, the PDSCH, the PUSCH, or the PBCH.

Further, an exemplary embodiment of the present disclosure may be applied to either terrestrial networks or a non-terrestrial network (NTN) such as communication using a satellite or a high-altitude pseudolite (High Altitude Pseudo Satellite (HAPS)). Further, an exemplary embodiment of the present disclosure may be applied to a terrestrial network having a large transmission delay compared to the symbol length or slot length, such as a network with a large cell size and/or an ultra-wideband transmission network.

(Antenna Port)

In an exemplary embodiment of the present disclosure, the antenna port refers to a logical antenna (antenna group) configured of one or more physical antennae. For example, the antenna port does not necessarily refer to one physical antenna and may refer to an array antenna or the like configured of a plurality of antennae. In one example, the number of physical antennae configuring the antenna port need not be specified, and the antenna port may be specified as the minimum unit with which a terminal station can transmit a Reference signal. Moreover, the antenna port may be specified as the minimum unit for multiplying a weight of a Precoding vector.

<5G NR System Architecture and Protocol Stacks>

3GPP has been working at the next release for the 5th generation cellular technology, simply called 5G, including the development of a new radio (NR) access technology operating in frequencies ranging up to 100 GHz. The first version of 5G standard was initially delivered in late 2017, which allows proceeding to trials and commercial deployments of 5G NR standard-compliant terminals, e.g., smartphones.

Figure 12:
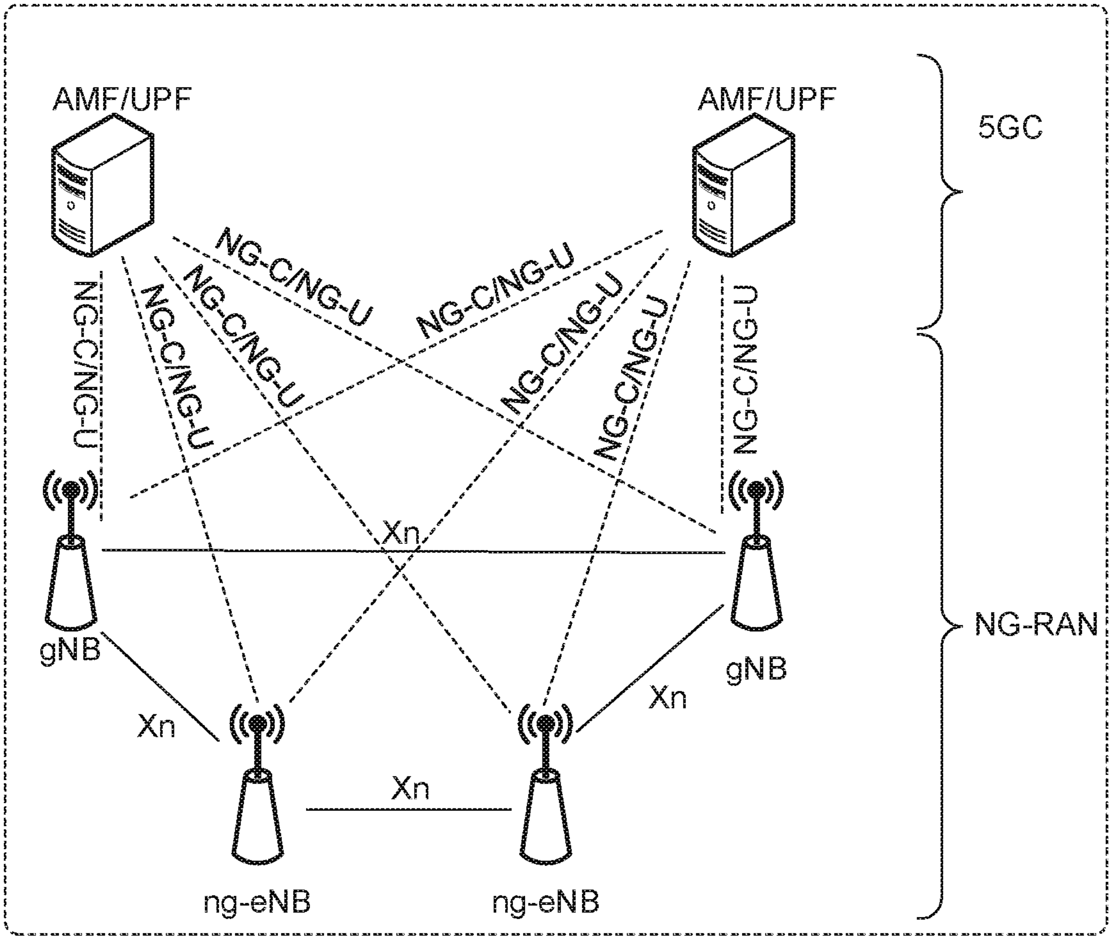
FIG. 12 illustrates an exemplary architecture of a 3GPP NR system.

For example, the overall system architecture assumes a Next Generation-Radio Access Network (NG-RAN) that includes gNBs. The gNBs provide the NG-radio access user plane (SDAP/PDCP/RLC/MAC/PHY) and control plane (RRC) protocol terminations towards a UE. The gNBs are interconnected with each other via an Xn interface. The gNBs are also connected to the Next Generation Core (NGC) via the Next Generation (NG) interface, more specifically to the Access and Mobility Management Function (AMF; e.g. a particular core entity performing the AMF) via the NG-C interface, and to the User Plane Function (UPF; e.g., a particular core entity performing the UPF) via the NG-U interface. The NG-RAN architecture is illustrated in FIG. 12 (see, e.g., 3GPP TS 38.300 v15.6.0, section 4).

The user plane protocol stack for NR (see, e.g., 3GPP TS 38.300, section 4.4.1) includes the Packet Data Convergence Protocol (PDCP, see clause 6.4 of TS 38.300) Radio Link Control (RLC, see clause 6.3 of TS 38.300) and Medium Access Control (MAC, see clause 6.2 of TS 38.300) sublayers. which are terminated in the gNB on the network side. Additionally, a new access stratum (AS) sublayer (Service Data Adaptation Protocol: SDAP) is introduced above the PDCP (see, e.g., clause 6.5 of 3GPP TS 38.300). A control plane protocol stack is also defined for NR (see, e.g., TS 38.300, section 4.4.2). An overview of the Layer 2 functions is given in clause 6 of TS 38.300. The functions of the PDCP, RLC, and MAC sublayers are listed respectively in clauses 6.4, 6.3. and 6.2 of TS 38.300. The functions of the RRC layer are listed in clause 7 of TS 38.300.

For example, the Medium-Access-Control layer handles logical-channel multiplexing, and scheduling and scheduling-related functions, including handling of different numerologies.

The physical layer (PHY) is, for example, responsible for coding, PHY HARQ processing, modulation, multi-antenna processing, and mapping of the signal to the appropriate physical time-frequency resources. The physical layer also handles mapping of transport channels to physical channels. The physical layer provides services to the MAC layer in the form of transport channels. A physical channel corresponds to the set of time-frequency resources used for transmission of a particular transport channel, and each transport channel is mapped to a corresponding physical channel. For example, the physical channels include a Physical Random Access Channel (PRACH), Physical Uplink Shared Channel (PUSCH), and Physical Uplink Control Channel (PUCCH) as uplink physical channels, and a Physical Downlink Shared Channel (PDSCH), Physical Downlink Control Channel (PDCCH), and Physical Broadcast Channel (PBCH) as downlink physical channels.

Use cases/deployment scenarios for NR could include enhanced mobile broadband (eMBB), ultra-reliable low-latency communications (URLLC), massive machine type communication (mMTC), which have diverse requirements in terms of data rates, latency, and coverage. For example, the eMBB is expected to support peak data rates (20 Gbps for downlink and 10 Gbps for uplink) and user-experienced data rates in the order of three times what is offered by IMT-Advanced. Meanwhile, in a case of the URLLC, the tighter requirements are put on ultra-low latency (0.5 ms for each of UL and DL for user plane latency) and high reliability (1-10-5 within 1 ms). Finally, the mMTC may preferably require high connection density (1,000,000 devices/$km^2$ in an urban environment), large coverage in harsh environments, and extremely long-life battery for low cost devices (15 years).

Thus, the OFDM numerology (e.g., subcarrier spacing, OFDM symbol duration, cyclic prefix (CP) duration, number of symbols per scheduling interval) that is suitable for one use case might not work well for another. For example, low-latency services may preferably require a shorter symbol duration (and thus larger subcarrier spacing) and/or fewer symbols per scheduling interval (also referred to as TTI) than an mMTC service. Furthermore, deployment scenarios with large channel delay spreads may preferably require a longer CP duration than scenarios with short delay spreads. The subcarrier spacing may be optimized accordingly to retain the similar CP overhead. NR may support more than one value of subcarrier spacing. Correspondingly, subcarrier spacing of 15 kHz, 30 kHz, 60 KHz . . . are currently considered. The symbol duration Tu and the subcarrier spacing Δf are directly related through the formula Δf=1/Tu. In a similar manner as in LTE systems, the term "resource element" can be used to denote a minimum resource unit being composed of one subcarrier for the length of one OFDM/SC-FDMA symbol.

In the new radio system 5G-NR, for each numerology and carrier, a resource grid of subcarriers and OFDM symbols is defined for each of uplink and downlink. Each element in the resource grid is called a resource element and is identified based on the frequency index in the frequency domain and the symbol position in the time domain (see 3GPP TS 38.211 v15.6.0).

<5G NR Functional Split between NG-RAN and 5GC>

Figure 13:
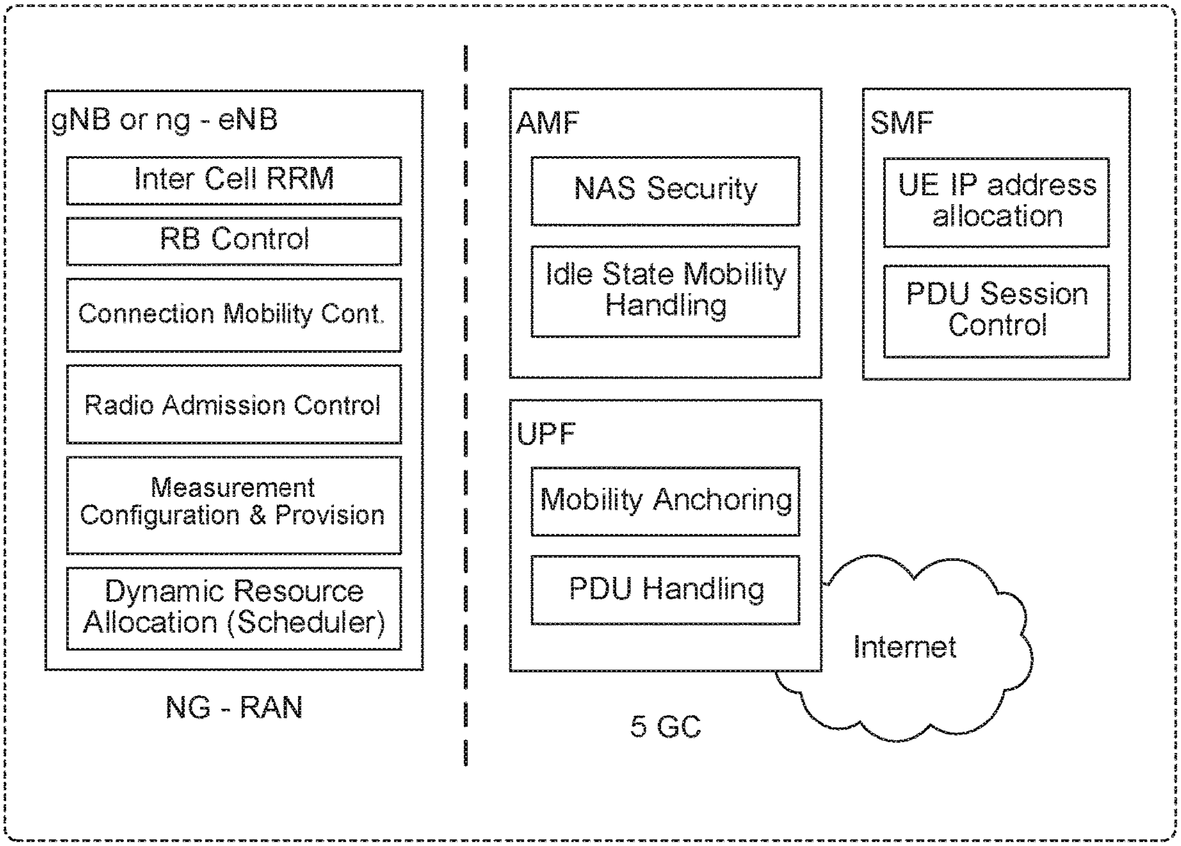
FIG. 13 is a schematic diagram illustrating a functional split between NG-RAN and 5GC.

FIG. 13 illustrates functional split between NG-RAN and 5GC. An NG-RAN logical node is a gNB or ng-eNB. The 5GC has logical nodes AMF, UPF, and SMF.

For example, the gNB and ng-eNB host the following main functions:

Functions for radio resource management such as radio bearer control, radio admission control, connection mobility control, dynamic allocation of resources to UEs in both uplink and downlink (scheduling);

IP header compression, encryption, and integrity protection of data;

Selection of an AMF at UE attachment when no routing to an AMF can be determined from the information provided by the UE;

Routing of user plane data towards UPF(s);

Routing of control plane information towards AMF;

Connection setup and release;

Scheduling and transmission of paging messages;

Scheduling and transmission of system broadcast information (originated from the AMF or Operation, Admission, Maintenance (OAM));

Measurement and measurement reporting configuration for mobility and scheduling;

Transport level packet marking in the uplink;

Session management;

Support of network slicing;

QoS Flow management and mapping to data radio bearers;

Support of UEs in RRC_INACTIVE state;

Distribution function for NAS messages;

Radio access network sharing;

Dual Connectivity; and

Tight interworking between NR and E-UTRA.

The access and mobility management function (AMF) hosts the following main functions:

Non-Access Stratum (NAS) signaling termination function;

NAS signaling security;

Access Stratum (AS) security control;

Inter Core Network (CN) node signaling for mobility between 3GPP access networks;

Idle mode UE reachability (including control and execution of paging retransmission);

Registration area management;

Support of intra-system and inter-system mobility;

Access authentication;

Access authorization including check of roaming rights;

Mobility management control (subscription and policies);

Support of network slicing; and

Session Management Function (SMF) selection.

Furthermore, the user plane function (UPF) hosts the following main functions:

Anchor point for intra-/inter-RAT mobility (when applicable);

External protocol data unit (PDU) session point of interconnect to a data network;

Packet routing and forwarding;

Packet inspection and user plane part of policy rule enforcement;

Traffic usage reporting;

Uplink classifier to support routing traffic flows to a data network;

Branching point to support multi-homed PDU session;

QoS handling for user plane (e.g. packet filtering, gating, and UL/DL rate enforcement);

Uplink traffic verification (SDF to QoS flow mapping); and

Downlink packet buffering and downlink data indication triggering.

Finally, the session management function (SMF) hosts the following main functions:

Session management;

UE IP address allocation and management;

Selection and control of UPF;

Configuration function of traffic steering at a user plane function (UPF) to route traffic to proper destination:

Control part of policy enforcement and QoS; and

Downlink data indication.

<RRC Connection Setup and Reconfiguration Procedures>

Figure 14:
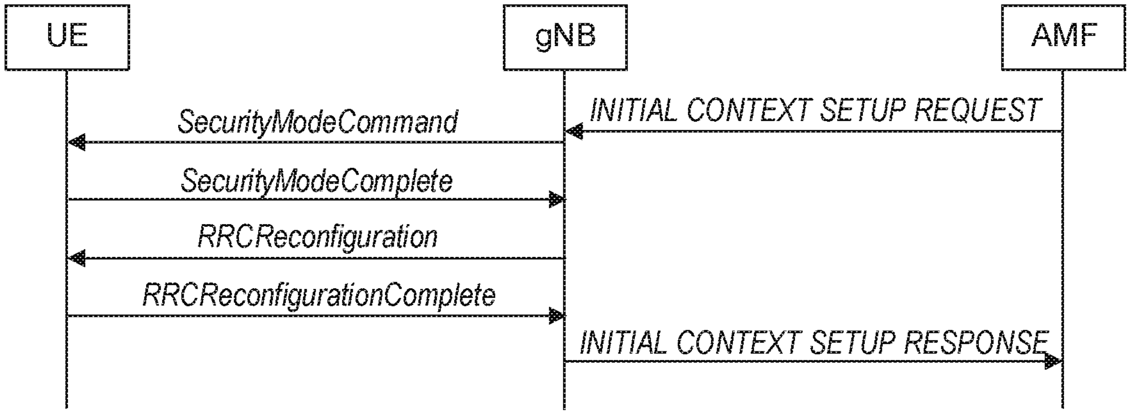
FIG. 14 is a sequence diagram of a Radio Resource Control (RRC) connection setup/reconfiguration procedure.

FIG. 14 illustrates some interactions between a UE, gNB, and AMF (a 5GC entity) in the context of a transition of the UE from RRC_IDLE to RRC_CONNECTED for the NAS part (see TS 38.300 v15.6.0).

RRC is a higher layer signaling (protocol) used for UE and gNB configuration. This transition involves that the AMF prepares the UE context data (including, for example, PDU session context, security key, UE radio capability, and UE security capabilities, etc.) and transmits the UE context data to the gNB with an INITIAL CONTEXT SETUP REQUEST. Then, the gNB activates the AS security with the UE, which is performed by the gNB transmitting a SecurityModeCommand message to the UE and by the UE responding to the gNB with a SecurityModeComplete message. Afterwards, the gNB performs the reconfiguration to set up the Signaling Radio Bearer 2 (SRB2) and Data Radio Bearer(s) (DRB(s)) by transmitting an RRCReconfiguration message to the UE and, in response, receiving an RRCReconfigurationComplete from the UE. For a signaling-only connection, the steps relating to the RRCReconfiguration are skipped since the SRB2 and DRBs are not setup. Finally, the gNB indicates to the AMF that the setup procedure is completed with an INITIAL CONTEXT SETUP RESPONSE.

In the present disclosure, thus, an entity (e.g., AMF, SMF, etc.) of the 5th Generation Core (5GC) is provided that includes control circuitry, which, in operation, establishes a Next Generation (NG) connection with a gNodeB, and a transmitter, which in operation, transmits an initial context setup message, via the NG connection, to the gNodeB to cause a signaling radio bearer setup between the gNodeB and user equipment (UE). In particular, the gNodeB transmits a radio resource control (RRC) signaling containing a resource allocation configuration information element (IE) to the UE via the signaling radio bearer. The UE then performs an uplink transmission or a downlink reception based on the resource allocation configuration.

<Usage Scenarios of IMT for 2020 and Beyond>

Figure 15:
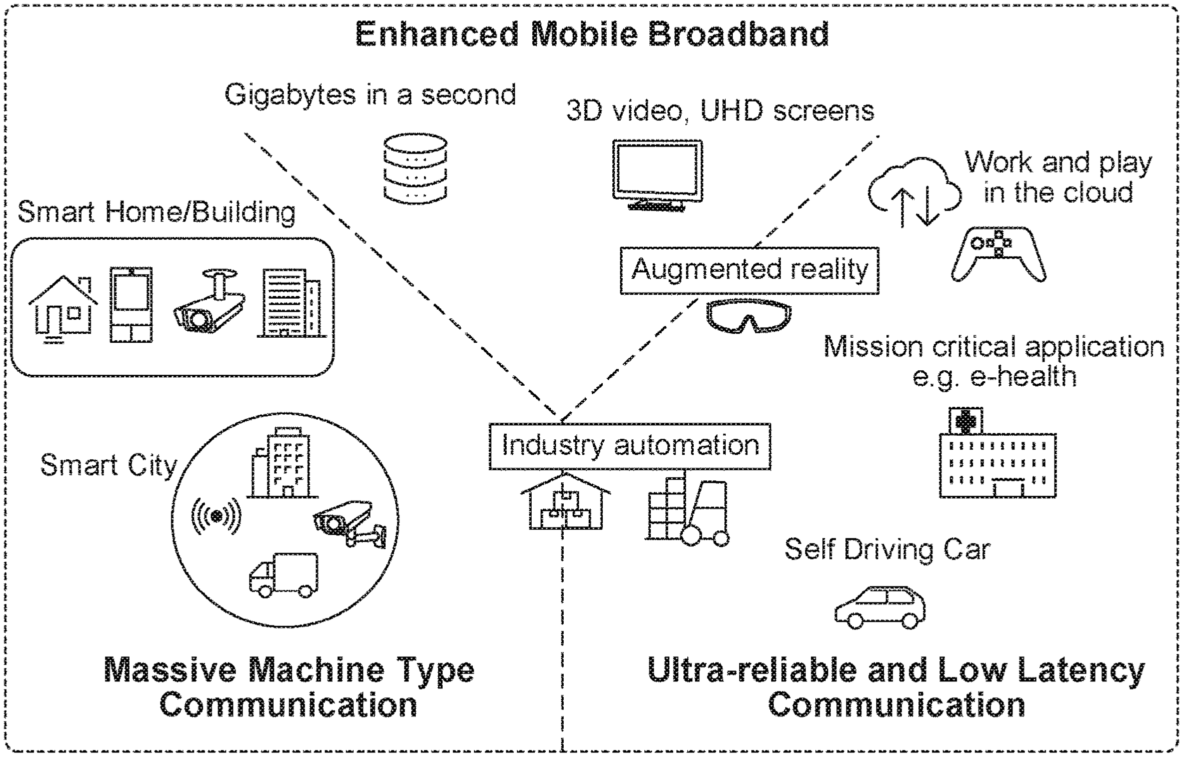
FIG. 15 is a schematic diagram illustrating a usage scenario of an enhanced Mobile BroadBand (eMBB), massive Machine Type Communications (mMTC), and Ultra Reliable and Low Latency Communications (URLLC)

FIG. 15 illustrates some of the use cases for 5G NR. In the 3rd generation partnership project new radio (3GPP NR), three use cases are being considered that have been envisaged to support a wide variety of services and applications by IMT-2020. The specification for the phase 1 of enhanced mobile-broadband (eMBB) has been concluded. In addition to further extending the eMBB support, the current and future work would involve the standardization for ultra-reliable and low-latency communications (URLLC) and massive machine-type communications (mMTC). FIG. 15 illustrates some examples of envisioned usage scenarios for IMT for 2020 and beyond (see, e.g., ITU-R M. 2083 FIG. 2).

The URLLC use case has stringent requirements for capabilities such as throughput, latency, and availability. The URLLC use case has been envisioned as one of element techniques to enable future vertical applications such as wireless control of industrial manufacturing or production processes, remote medical surgery, distribution automation in a smart grid, transportation safety, etc. Ultra-reliability for the URLLC is to be supported by identifying the techniques to meet the requirements set by TR 38.913. For NR URLLC in Release 15, key requirements include a target user plane latency of 0.5 ms for uplink (UL) and 0.5 ms for downlink (DL). The general URLLC requirement for one transmission of a packet is a block error rate (BLER) of 1E-5 for a packet size of 32 bytes with a user plane latency of 1 ms.

From the physical layer perspective, reliability can be improved in a number of possible ways. The current scope for improving the reliability involves defining separate CQI tables for the URLLC, more compact DCI formats, repetition of PDCCH, etc. However, the scope may widen for achieving ultra-reliability as the NR becomes more stable and developed (for NR URLLC key requirements). Particular use cases of NR URLLC in Release 15 include augmented reality/virtual reality (AR/VR), e-health, e-safety, and mission-critical applications.

Moreover, technology enhancements targeted by NR URLLC aim at latency improvement and reliability improvement. Technology enhancements for latency improvement include configurable numerology, non slot-based scheduling with flexible mapping, grant free (configured grant) uplink, slot-level repetition for data channels, and downlink pre-emption. The pre-emption means that a transmission for which resources have already been allocated is stopped, and the already allocated resources are used for another transmission that has been requested later but has lower latency/higher priority requirements. Accordingly, the already granted transmission is replaced with a later transmission. The pre-emption is applicable independent of the particular service type. For example, a transmission for a service-type A (URLLC) may be replaced with a transmission for a service type B (such as eMBB). Technology enhancements with respect to reliability improvement include dedicated CQI/MCS tables for the target BLER of IE-5.

The use case of the mMTC (massive machine type communication) is characterized by a very large number of connected devices typically transmitting a relatively low volume of non-delay sensitive data. Devices are required to be low cost and to have a very long battery life. From the NR perspective, utilizing very narrow bandwidth parts is one possible solution to have power saving from the UE perspective and enable the long battery life.

As mentioned above, it is expected that the scope of reliability improvement in NR becomes wider. One key requirement to all the cases, and especially necessary for the URLLC and mMTC for example, is high reliability or ultra-reliability. Several mechanisms can be considered to improve the reliability from the radio perspective and network perspective. In general, there are a few key important areas that can help improve the reliability. These areas include compact control channel information, data/control channel repetition, and diversity with respect to the frequency, time, and/or spatial domain. These areas are applicable to reliability improvement in general, regardless of particular communication scenarios.

For NR URLLC, further use cases with tighter requirements have been considered such as factory automation, transport industry, and electrical power distribution. The tighter requirements are higher reliability (up to 10-6 level), higher availability, packet size of up to 256 bytes, time synchronization down to the order of a few us where the value can be one or a few us depending on frequency range and short latency in the order of 0.5 to 1 ms (e.g., target user plane latency of 0.5 ms) depending on the use cases.

Moreover, for NR URLLC, several technology enhancements from the physical layer perspective have been identified. These technology enhancements include Physical Downlink Control Channel (PDCCH) enhancements related to compact DCI, PDCCH repetition, and increased PDCCH monitoring. In addition, Uplink Control Information (UCI) enhancements are related to enhanced Hybrid Automatic Repeat Request (HARQ) and CSI feedback enhancements. Also, PUSCH enhancements related to mini-slot level hopping and retransmission/repetition enhancements have been identified. The term "mini-slot" refers to a transmission time interval (TTI) including a smaller number of symbols than a slot (a slot includes fourteen symbols).

<QoS Control>

The 5G Quality of Service (QOS) model is based on QoS flows and supports both QoS flows that require guaranteed flow bit rate (GBR QoS flows) and QoS flows that do not require guaranteed flow bit rate (non-GBR QoS Flows). At the NAS level, the QoS flow is thus the finest granularity of QoS differentiation in a PDU session. A QoS flow is identified within a PDU session by a QoS flow ID (QFI) carried in an encapsulation header over the NG-U interface.

For each UE, the 5GC establishes one or more PDU sessions. For each UE, the NG-RAN establishes at least one Data Radio Bearer (DRB) together with the PDU session, for example as illustrated above with reference to FIG. 14. Additional DRB(s) for QoS flow(s) of that PDU session can be subsequently configured (it is up to NG-RAN when to do so). The NG-RAN maps packets belonging to different PDU sessions to different DRBs. NAS level packet filters in the UE and 5GC associate UL and DL packets with QoS flows, whereas AS-level mapping rules in the UE and in the NG-RAN associate UL and DL Qos flows with DRBs.

Figure 16:
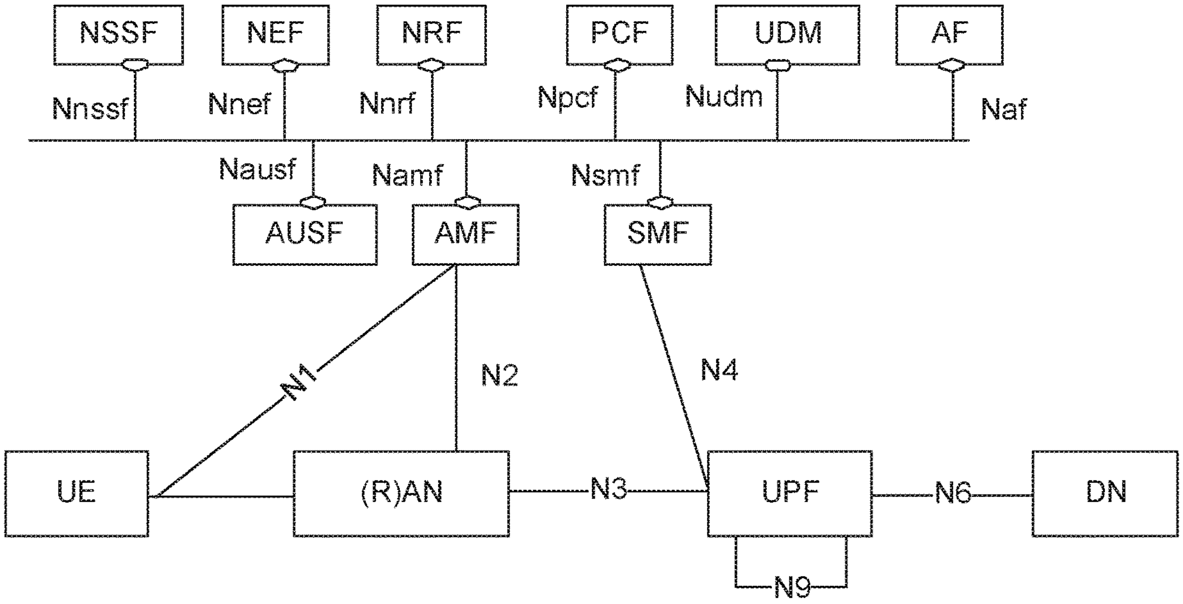
FIG. 16 is a block diagram illustrating an exemplary 5G system architecture for a non-roaming scenario.

FIG. 16 illustrates a 5G NR non-roaming reference architecture (see TS 23.501 v16.1.0, section 4.23). An Application Function (AF, e.g., an external application server hosting 5G services exemplified in FIG. 15) interacts with the 3GPP core network in order to provide services, for example, to support application influence on traffic routing, accessing a Network Exposure Function (NEF) or interacting with the policy framework for policy control (see Policy Control Function, PCF), e.g., QoS control. Based on operator deployment, application functions considered to be trusted by the operator can be allowed to interact directly with relevant network functions. Application functions not allowed by the operator to access directly the network functions use the external exposure framework via the NEF to interact with relevant network functions.

FIG. 16 illustrates further functional units of the 5G architecture, namely a Network Slice Selection Function (NSSF), Network Repository Function (NRF), Unified Data Management (UDM), Authentication Server Function (AUSF), Access and Mobility Management Function (AMF), Session Management Function (SMF), and Data Network (DN, e.g., operator services, Internet access, or 3rd party services). All of or a part of the core network functions and the application services may be deployed and running on cloud computing environments.

In the present disclosure, thus, an application server (e.g., AF of the 5G architecture), is provided that includes a transmitter, which in operation, transmits a request containing a QoS requirement for at least one of the URLLC, eMMB, and mMTC services to at least one of functions (for example NEF, AMF, SMF, PCF, UPF, etc) of the SGC to establish a PDU session including a radio bearer between a gNodeB and a UE in accordance with the QoS requirement, and control circuitry, which, in operation, performs the services using the established PDU session.

The present disclosure can be realized by software, hardware, or software in cooperation with hardware. Each functional block used in the description of each embodiment described above can be partly or entirely realized by an LSI such as an integrated circuit, and each process described in the each embodiment may be controlled partly or entirely by the same LSI or a combination of LSIs. The LSI may be individually formed as chips, or one chip may be formed so as to include a part or all of the functional blocks. The LSI may include a data input and output coupled thereto. The LSI here may be referred to as an IC, a system LSI, a super LSI, or an ultra LSI depending on a difference in the degree of integration. The technique of implementing an integrated circuit is not limited to the LSI, however, and may be realized by using a dedicated circuit, a general-purpose processor, or a special-purpose processor. In addition, a FPGA (Field Programmable Gate Array) that can be programmed after the manufacture of the LSI or a reconfigurable processor in which the connections and the settings of circuit cells disposed inside the LSI can be reconfigured may be used. The present disclosure can be realized as digital processing or analogue processing. If future integrated circuit technology replaces LSIs as a result of the advancement of semiconductor technology or other derivative technology, the functional blocks could be integrated using the future integrated circuit technology. Biotechnology can also be applied.

The present disclosure can be realized by any kind of apparatus, device or system having a function of communication, which is referred to as a communication apparatus. The communication apparatus may comprise a transceiver and processing/control circuitry. The transceiver may comprise and/or function as a receiver and a transmitter. The transceiver, as the transmitter and receiver, may include an RF (radio frequency) module including amplifiers, RF modulators/demodulators and the like, and one or more antennas. Some non-limiting examples of such a communication apparatus include a phone (e.g. cellular (cell) phone, smart phone), a tablet, a personal computer (PC) (e.g, laptop, desktop, netbook), a camera (e.g, digital still/video camera), a digital player (digital audio/video player), a wearable device (e.g, wearable camera, smart watch, tracking device), a game console, a digital book reader, a telehealth/telemedicine (remote health and medicine) device, and a vehicle providing communication functionality (e.g., automotive, airplane, ship), and various combinations thereof.

The communication apparatus is not limited to be portable or movable, and may also include any kind of apparatus, device or system being non-portable or stationary, such as a smart home device (e.g, an appliance, lighting, smart meter, control panel), a vending machine, and any other “things” in a network of an “Internet of Things (IoT)”.

The communication may include exchanging data through, for example, a cellular system, a wireless LAN system, a satellite system, etc., and various combinations thereof.

The communication apparatus may comprise a device such as a controller or a sensor which is coupled to a communication device performing a function of communication described in the present disclosure. For example, the communication apparatus may comprise a controller or a sensor that generates control signals or data signals which are used by a communication device performing a communication function of the communication apparatus.

The communication apparatus also may include an infrastructure facility, such as a base station, an access point, and any other apparatus. device or system that communicates with or controls apparatuses such as those in the above non-limiting examples.

A base station according to an embodiment of the present disclosure includes: control circuitry, which, in operation, generates a control signal related to a configuration of a first bandwidth part based on a parameter for which a number of candidates is less than that for a parameter of a second bandwidth part; and transmission circuitry, which, in operation, transmits the control signal.

In the embodiment of the present disclosure, the control signal includes information identifying each of a plurality of candidates for a parameter of the first bandwidth part.

In the embodiment of the present disclosure, when a number of the plurality of candidates for the parameter of the first bandwidth part is one, the control circuitry does not include the parameter in the control signal.

In the embodiment of the present disclosure, the control signal includes a common value for a parameter of each of a plurality of the first bandwidth parts.

In the embodiment of the present disclosure, the parameter is at least one of a frequency position, a bandwidth, subcarrier spacing, and/or a Transmission Configuration Index (TCI) state.

In the embodiment of the present disclosure, a number of candidates for a parameter of the first bandwidth part is determined based on a bandwidth supported by a terminal.

In the embodiment of the present disclosure, a number of candidates for a parameter of the first bandwidth part is determined based on a resource block size.

In the embodiment of the present disclosure, a number of candidates for a parameter of the first bandwidth part is determined based on channel raster spacing.

A terminal according to an embodiment of the present disclosure includes: reception circuitry, which, in operation, receives a control signal related to a configuration of a first bandwidth part, the control signal being generated based on a parameter for which a number of candidates is less than that for a parameter of a second bandwidth part; and control circuitry, which, in operation, controls the configuration of the first bandwidth part based on the control signal.

In a communication method according to an embodiment of the present disclosure, a base station generates a control signal related to a configuration of a first bandwidth part based on a parameter for which a number of candidates is less than that for a parameter of a second bandwidth part, and transmits the control signal.

In a communication method according to an embodiment of the present disclosure, a terminal receives a control signal related to a configuration of a first bandwidth part, the control signal being generated based on a parameter for which a number of candidates is less than that for a parameter of a second bandwidth part, and controls the configuration of the first bandwidth part based on the control signal.

The disclosure of Japanese Patent Application No. 2021-053453, filed on Mar. 26, 2021, including the specification, drawings and abstract, is incorporated herein by reference in its entirety.

Industrial Applicability

An exemplary embodiment of the present disclosure is useful for radio communication systems.

REFERENCE SIGNS LIST

100 Base station
101, 206 Controller
102 DCI generator
103 Higher layer signal generator
104, 207 Encoder/Modulator
105 Signal mapper
106, 208 Transmitter
107, 201 Antenna
108, 202 Receiver

109, 205 Demodulator/decoder
200 Terminal
203 Signal separator
204 DCI detector

The invention claimed is:

1. A base station, comprising:

control circuitry, which, in operation, generates a control signal related to a configuration of a first bandwidth part based on a parameter for which a number of candidates is less than that for a corresponding parameter of a second bandwidth part different from the first bandwidth part; and transmission circuitry, which, in operation, transmits the control signal, wherein, the parameter for the first bandwidth part indicates a frequency position of the first bandwidth part, a number of candidates for the parameter of the first bandwidth part is determined based on a least common multiple of a channel raster spacing and a resource block size, the corresponding parameter for the second bandwidth part is represented by information indicating an actual value of the corresponding parameter, when there are a plurality of candidates for the parameter of the first bandwidth part, the control signal includes information identifying one of the plurality of candidates for the parameter of the first bandwidth part, and when the number of candidates for the parameter of the first bandwidth part is one, the control circuitry does not include the parameter in the control signal.

2. The base station according to claim 1, wherein the control signal includes a common value for a parameter of each of a plurality of the first bandwidth parts.

3. The base station according to claim 1, wherein a number of candidates for the parameter of the first bandwidth part is determined based on a bandwidth supported by a terminal.

4. A terminal, comprising:

reception circuitry, which, in operation, receives a control signal related to a configuration of a first bandwidth part, the control signal being generated based on a parameter for which a number of candidates is less than that for a corresponding parameter of a second bandwidth part different from the first bandwidth part; and control circuitry, which, in operation, controls the configuration of the first bandwidth part based on the control signal, wherein, the parameter for the first bandwidth part indicates a frequency position of the first bandwidth part, a number of candidates for the parameter of the first bandwidth part is determined based on a least common multiple of a channel raster spacing and a resource block size, the corresponding parameter for the second bandwidth part is represented by information indicating an actual value of the corresponding parameter, when there are a plurality of candidates for the parameter of the first bandwidth part, the control signal includes information identifying one of the plurality of candidates for the parameter of the first bandwidth part, and when the number of candidates for the parameter of the first bandwidth part is one, the parameter is not included in the control signal.

5. A communication method, comprising:

generating, by a base station, a control signal related to a configuration of a first bandwidth part based on a parameter for which a number of candidates is less than that for a corresponding parameter of a second bandwidth part different from the first bandwidth part; and transmitting, by the base station, the control signal, wherein, the parameter for the first bandwidth part indicates a frequency position of the first bandwidth part, a number of candidates for the parameter of the first bandwidth part is determined based on a least common multiple of a channel raster spacing and a resource block size, the corresponding parameter for the second bandwidth part is represented by information indicating an actual value of the corresponding parameter, when there are a plurality of candidates for the parameter of the first bandwidth part, the control signal includes information identifying one of the plurality of candidates for the parameter of the first bandwidth part, and when the number of candidates for the parameter of the first bandwidth part is one, the parameter is not included in the control signal.

6. A communication method, comprising:

receiving, by a terminal, a control signal related to a configuration of a first bandwidth part, the control signal being generated based on a parameter for which a number of candidates is less than that for a corresponding parameter of a second bandwidth part different from the first bandwidth part; and controlling, by the terminal, the configuration of the first bandwidth part based on the control signal, wherein, the parameter for the first bandwidth part indicates a frequency position of the first bandwidth part, a number of candidates for the parameter of the first bandwidth part is determined based on a least common multiple of a channel raster spacing and a resource block size, the corresponding parameter for the second bandwidth part is represented by information indicating an actual value of the corresponding parameter, when there are a plurality of candidates for the parameter of the first bandwidth part, the control signal includes information identifying one of the plurality of candidates for the parameter of the first bandwidth part, and when the number of candidates for the parameter of the first bandwidth part is one, the parameter is not included in the control signal.

* * * * *